(12) United States Patent
Togino

(10) Patent No.: US 6,185,046 B1
(45) Date of Patent: Feb. 6, 2001

(54) MULTIPLE PRISM IMAGE FORMING OPTICAL SYSTEM

(75) Inventor: Takayoshi Togino, Hachioji (JP)

(73) Assignee: Olympus Optical Co., Ltd., Tokyo (JP)

( * ) Notice: Under 35 U.S.C. 154(b), the term of this patent shall be extended for 0 days.

(21) Appl. No.: 09/330,139

(22) Filed: Jun. 11, 1999

(30) Foreign Application Priority Data

Jul. 24, 1998 (JP) ................................................ 10-209831

(51) Int. Cl.$^7$ .................................................. G02B 27/14
(52) U.S. Cl. ........................... 359/631; 359/633; 359/637
(58) Field of Search .................................... 359/630, 631, 359/633, 637

(56) References Cited

U.S. PATENT DOCUMENTS

| | | | |
|---|---|---|---|
| 5,699,194 | 12/1997 | Takahashi | 359/633 |
| 5,701,202 | 12/1997 | Takahashi | 359/631 |
| 5,745,295 | 4/1998 | Takahashi | 359/631 |
| 5,751,494 | * 5/1998 | Takahashi | 359/631 |

OTHER PUBLICATIONS

European Abstract, Dialog(R)File 352: Derwent WPI, 1999, No. 010534976, Japanese Patent Pub. 7–333551 Jun. 1994, EPA 687932 Abst Dec. 1995.
European Abstract, Dialog(R)File 352: Derwent WPI, 1999, No. 011965452, Japanese Patent Pub. 10–153748 Jun. 1998.
European Abstract, Dialog(R)File 352: Derwent WPI, 1999, No. 010585485, Japanese Patent Pub. 07–333505 Dec. 1995.
Patent Abstracts of Japan, Pub. No. 08–292,368 Nov. 1996.
Patent Abstracts of Japan, Pub. No. 08–292,371 Nov. 1996.
Patent Abstracts of Japan, Pub. No. 08–292,372 Nov. 1996.
European Abstract, Dialog(R)File 352: Derwent WPI, 1999, No. 011144717, Japanese Patent Pub. 09–005650 Jan. 1997.
European Abstract, Dialog(R)File 352: Derwent WPI, 1999, No. 011662889, Japanese Patent Pub. 09–090229 Apr. 1997.
European Abstract, Dialog(R)File 352: Derwent WPI, 1999, No. 011459296, Japanese Patent Pub. 09–211331 Jan. 1996.
European Abstract, Dialog(R)File 352: Derwent WPI, 1999, No. 011426976, Japanese Patent Pub. 09–222561 Feb. 1996.
European Abstract, Dialog(R)File 352: Derwent WPI, 1999, No. 011498469, Japanese Patent Pub. 09–222563 Aug. 1997, EP 790513 Abst Aug. 1997.
European Abstract, Dialog(R)File 352: Derwent WPI, 1999, No. 011529109, Japanese Patent Pub. 09–258105 Mar. 1996.
European Abstract, Dialog(R)File 352: Derwent WPI, 1999, No. 011529109, Japanese Patent Pub. 09–258106 Mar. 1993, EP 802436 A2 Oct. 1997.
European Abstract, Dialog(R)File 352: Derwent WPI, 1999, No. 011426976, Japanese Patent Pub. 10–020196 Jul. 1996, EP 790513 A2 Aug. 1997.

* cited by examiner

*Primary Examiner*—Ricky Mack
(74) *Attorney, Agent, or Firm*—Pillsbury Madison & Sutro LLP

(57) ABSTRACT

A high-performance image-forming optical system made compact and thin by folding an optical path using reflecting surfaces arranged to minimize the number of reflections. The image-forming optical system has a first prism placed on the object side and a second prism placed on the image side and does not form an intermediate image. The first and second prisms each have a first surface through which a light beam enters the prism, a second surface reflecting the incident light beam in the prism, a third surface reflecting the reflected light beam in the prism, and a fourth surface through which the light beam exits from the prism. At least one of the second and third surfaces has a rotationally asymmetric curved surface configuration that gives a power to a light beam and corrects aberrations due to decentration. Any optical element that gives a refracting power contributing to the image-forming action of a light beam is not placed between the second prism and an image formed by the image-forming optical system.

34 Claims, 13 Drawing Sheets

80 Objective optical system for observation

MULTIPLE PRISM IMAGE FORMING OPTICAL SYSTEM

BACKGROUND OF THE INVENTION

1. Field of the Invention

The present invention relates to image-forming optical systems. More particularly, the present invention relates to a decentered optical system with a reflecting surface having a power for use in optical apparatuses using a small-sized image pickup device, e.g. video cameras, digital still cameras, film scanners, and endoscopes.

2. Description of the Invention

Recently, with the achievement of small-sized image pickup devices, image-forming optical systems have also been demanded to reduce the size, weight, and the cost of video cameras, digital still cameras, film scanners, endoscopes, etc.

In the general rotationally symmetric coaxial optical systems, however, optical elements are arranged in the direction of the optical axis. Therefore, there is a limit to the reduction in thickness of the optical systems. At the same time, the number of lens elements unavoidably increases because it is necessary to correct chromatic aberration produced by a rotationally symmetric refracting lens used in the optical systems. Therefore, it is difficult to reduce the cost in the present state of the art. Under these circumstances, there have recently been proposed optical systems designed to be compact in size by giving a power to a reflecting surface, which produces no chromatic aberration, and folding an optical path in the optical axis direction.

Japanese Patent Application Unexamined Publication Number [hereinafter referred to as "JP(A)"] 7-333505 proposes to reduce the thickness of an optical system by giving a power to a decentered reflecting surface and folding an optical path. In an example thereof, however, the number of constituent optical members is as large as five, and actual optical performance is unclear. No mention is made of the configuration of the reflecting surface.

JP(A) 8-292371, 9-5650 and 9-90229 each disclose an optical system in which an optical path is folded by a single prism or a plurality of mirrors integrated into a single block, and an image is relayed in the optical system to form a final image. In these conventional examples, however, the number of reflections increases because the image is relayed. Accordingly, surface accuracy errors and decentration accuracy errors are transferred while being added up. Consequently, the accuracy required for each surface becomes tight, causing the cost to increase unfavorably. The relay of the image also causes the overall volumetric capacity of the optical system to increase unfavorably.

JP(A) 9-222563 discloses an example of an optical system that uses a plurality of prisms. However, because the optical system is arranged to relay an image, the cost increases and the optical system becomes large in size unfavorably for the same reasons as stated above.

JP(A) 9-211331 discloses an example of an optical system in which an optical path is folded by using a single prism to achieve a reduction in size of the optical system. However, the optical system is not satisfactorily corrected for aberrations.

JP(A) 8-292368, 8-292372, 9-222561, 9-258105 and 9-258106 all disclose examples of zoom lens systems. In these examples, however, the number of reflections is undesirably large because an image is relayed in a prism. Therefore, surface accuracy errors and decentration accuracy errors of reflecting surfaces are transferred while being added up, unfavorably. At the same time, the overall size of the optical system unavoidably increases, unfavorably.

JP(A) 10-20196 discloses an example of a two-unit zoom lens system having a positive front unit and a negative rear unit, in which the positive front unit comprises a prism of negative power placed on the object side of a stop and a prism of positive power placed on the image side of the stop. JP(A) 10-20196 also discloses an example in which the positive front unit, which comprises a prism of negative power and a prism of positive power, is divided into two to form a three-unit zoom lens system having a negative unit, a positive unit and a negative unit. However, the prisms used in these examples each have two transmitting surfaces and two reflecting surfaces, which are all independent surfaces. Therefore, a relatively wide space must be ensured for the prisms. In addition, the image plane is large in size to conform to the Leica size film format. Accordingly, the prisms themselves become unavoidably large in size. Furthermore, because the disclosed zoom lens systems are not telecentric on the image side, it is difficult to apply them to image pickup devices such as CCDs. In either of the examples of zoom lens systems, zooming is performed by moving the prisms. Accordingly, the decentration accuracy required for the reflecting surfaces becomes tight in order to maintain the required performance over the entire zooming range, resulting in an increase in the cost.

The above-mentioned JP(A) 10-20196 discloses an optical system having, as shown in FIG. 17, a first prism 210, a stop 202, a second prism 220 similar to the first prism 210, a refracting lens 204, and an image plane 203. The first prism 210 has a first transmitting surface 211, a first reflecting surface 212, a second reflecting surface 213, and a second transmitting surface 214. The second prism 220 has a first transmitting surface 221, a first reflecting surface 222, a second reflecting surface 223, and a second transmitting surface 224. In this optical system, however, a principal ray a entering the first prism 210 and a principal ray b exiting from the first prism 210 (principal ray entering the second prism 220) and further a principal ray c exiting from the second prism 220 lie approximately parallel to each other, and the principal rays a and c extend in an approximately straight line. Moreover, the second prism 220 is placed right behind the first prism 210 in series, and the lens 204, which has a refracting power, is placed between the second prism 220 and the image plane 203. Therefore, the degree of design freedom is limited to a considerable extent. In addition, it is difficult to make the optical system thin in the direction of the thickness.

When a general refracting optical system is used to obtain a desired refracting power, chromatic aberration occurs at an interface surface thereof according to chromatic dispersion characteristics of an optical element. To correct the chromatic aberration and also correct other ray aberrations, the refracting optical system needs a large number of constituent elements, causing the cost to increase. In addition, because the optical path extends straight along the optical axis, the entire optical system undesirably lengthens in the direction of the optical axis, resulting in an unfavorably large-sized image pickup apparatus.

In decentered optical systems such as those described above in regard to the prior art, an imaged figure or the like is undesirably distorted and the correct shape cannot be reproduced unless the formed image is favorably corrected for aberrations, particularly rotationally asymmetric distortion.

Furthermore, in a case where a reflecting surface is used in a decentered optical system, the sensitivity to decentration errors of the reflecting surface is twice as high as that in the case of a refracting surface, and as the number of reflections increases, decentration errors that are transferred while being added up increase correspondingly. Consequently, manufacturing accuracy and assembly accuracy, e.g. surface accuracy and decentration accuracy, required for reflecting surfaces become even more strict.

SUMMARY OF THE INVENTION

In view of the above-described problems of the prior art, an object of the present invention is to provide a high-performance and low-cost image-forming optical system having a minimal number of constituent optical elements.

Another object of the present invention is to provide a high-performance image-forming optical system that is made compact and thin by folding an optical path using reflecting surfaces arranged to minimize the number of reflections.

To attain the above-described objects, the present invention provides an image-forming optical system having a positive refracting power as a whole for forming an object image. The image-forming optical system has a first prism and a second prism, which are each formed from a medium having a refractive index (n) larger than 1 (n>1). The second prism is placed on the image side of the first prism. The image-forming optical system does not form an intermediate image. The first prism has, in order from the object side thereof, a first surface through which a light beam enters the first prism, and a second surface that reflects the light beam in the first prism. The first prism further has a third surface that reflects the reflected light beam in the first prism, and a fourth surface through which the light beam exits from the first prism. At least one of the second and third surfaces of the first prism has a curved surface configuration that gives a power to a light beam. The curved surface configuration has a rotationally asymmetric surface configuration that corrects aberrations due to decentration. The second prism has, in order from the object side thereof, a first surface through which a light beam enters the second prism, and a second surface that reflects the light beam in the second prism. The second prism further has a third surface that reflects the reflected light beam in the second prism, and a fourth surface through which the light beam exits from the second prism. At least one of the second and third surfaces of the second prism has a curved surface configuration that gives a power to a light beam. The curved surface configuration has a rotationally asymmetric surface configuration that corrects aberrations due to decentration. Any optical element that gives a refracting power contributing to the image-forming action of a light beam is not placed between the second prism and an image formed by the image-forming optical system.

Another image-forming optical system according to the present invention, which is provided to attain the above-described objects, is an image-forming optical system having a positive refracting power as a whole for forming an object image. The image-forming optical system has a first prism and a second prism, which are each formed from a medium having a refractive index (n) larger than 1 (n>1). The second prism is placed on the image side of the first prism. The image-forming optical system does not form an intermediate image. The first prism has, in order from the object side thereof, a first surface through which a light beam enters the first prism, and a second surface that reflects the light beam in the first prism. The first prism further has a third surface that reflects the reflected light beam in the first prism, and a fourth surface through which the light beam exits from the first prism. At least one of the second and third surfaces of the first prism has a curved surface configuration that gives a power to a light beam. The curved surface configuration has a rotationally asymmetric surface configuration that corrects aberrations due to decentration. The second prism has, in order from the object side thereof, a first surface through which a light beam enters the second prism, and a second surface that reflects the light beam in the second prism. The second prism further has a third surface that reflects the reflected light beam in the second prism, and a fourth surface through which the light beam exits from the second prism. At least one of the second and third surfaces of the second prism has a curved surface configuration that gives a power to a light beam. The curved surface configuration has a rotationally asymmetric surface configuration that corrects aberrations due to decentration. The second prism is arranged such that the axial principal ray that is led from the third surface of the second prism to the fourth surface of the second prism is closer to the axial principal ray that is led from the third surface of the first prism to the fourth surface of the first prism than the axial principal ray of the light beam incident on the first prism that is led from the first surface of the first prism to the second surface of the first prism and the extension of this axial principal ray.

Still another image-forming optical system according to the present invention, which is provided to attain the above-described objects, is an image-forming optical system having a positive refracting power as a whole for forming an object image. The image-forming optical system has a first prism and a second prism, which are each formed from a medium having a refractive index (n) larger than 1 (N>1). The second prism is placed on the image side of the first prism. The image-forming optical system does not form an intermediate image. The first prism has, in order from the object side thereof, a first surface through which a light beam enters the first prism, and a second surface that reflects the light beam in the first prism. The first prism further has a third surface that reflects the reflected light beam in the first prism, and a fourth surface through which the light beam exits from the first prism. At least one of the second and third surfaces of the first prism has a curved surface configuration that gives a power to a light beam. The curved surface configuration has a rotationally asymmetric surface configuration that corrects aberrations due to decentration. The second prism has, in order from the object side thereof, a first surface through which a light beam enters the second prism, and a second surface that reflects the light beam in the second prism. The second prism further has a third surface that reflects the reflected light beam in the second prism, and a fourth surface through which the light beam exits from the second prism. At least one of the second and third surfaces of the second prism has a curved surface configuration that gives a power to a light beam. The curved surface configuration has a rotationally asymmetric surface configuration that corrects aberrations due to decentration. The fourth surface of the first prism and the first surface of the second prism face each other. The third surface of the second prism does not face the second surface of the first prism but lies closer to the fourth surface of the first prism than the second surface of the first prism. Consequently, the first and second surfaces of the first prism and the third and fourth surfaces of the second prism and further the image plane do not lie in parallel on a line extending straight from the axial principal ray entering the first prism. The third and fourth surfaces of the second prism and the image plane are off the line extending straight from the axial principal ray entering the first prism.

The reasons for adopting the above-described arrangements in the present invention, together with the functions thereof, will be described below in order.

The first image-forming optical system according to the present invention, which is provided to attain the above-described objects, has a first prism and a second prism, which are each formed from a medium having a refractive index (n) larger than 1 (N>1). The second prism is placed on the image side of the first prism. The image-forming optical system does not form an intermediate image.

A refracting optical element such as a lens is provided with a power by giving a curvature to an interface surface thereof. Accordingly, when rays are refracted at the interface surface of the lens, chromatic aberration unavoidably occurs according to chromatic dispersion characteristics of the refracting optical element. Consequently, the common practice is to add another refracting optical element for the purpose of correcting the chromatic aberration.

Meanwhile, a reflecting optical element such as a mirror or a prism produces no chromatic aberration in theory even when a reflecting surface thereof is provided with a power, and need not add another optical element only for the purpose of correcting chromatic aberration. Accordingly, an optical system using a reflecting optical element allows the number of constituent optical elements to be reduced from the viewpoint of chromatic aberration correction in comparison to an optical system using a refracting optical element.

At the same time, a reflecting optical system using a reflecting optical element allows the optical system itself to be compact in size in comparison to a refracting optical system because the optical path is folded in the reflecting optical system.

Reflecting surfaces require a high degree of accuracy for assembly and adjustment because they have high sensitivity to decentration errors in comparison to refracting surfaces. However, among reflecting optical elements, prisms, in which the positional relationship between surfaces is fixed, only need to control decentration as a single unit of prism and do not need high assembly accuracy and a large number of man-hours for adjustment as are needed for other reflecting optical elements.

Furthermore, a prism has an entrance surface and an exit surface, which are refracting surfaces, and a reflecting surface. Therefore, the degree of freedom for aberration correction is high in comparison to a mirror, which has only a reflecting surface. In particular, if the prism reflecting surface is assigned the greater part of the desired power to thereby reduce the powers of the entrance and exit surfaces, which are refracting surfaces, it is possible to reduce chromatic aberration to a very small quantity in comparison to refracting optical elements such as lenses while maintaining the degree of freedom for aberration correction at a high level in comparison to mirrors. Furthermore, the inside of a prism is filled with a transparent medium having a refractive index higher than that of air. Therefore, it is possible to obtain a longer optical path length than in the case of air. Accordingly, the use of a prism makes it possible to obtain an optical system that is thinner and more compact than those formed from lenses, mirrors and so forth, which are placed in the air.

In addition, an image-forming optical system is required to exhibit favorable image-forming performance as far as the peripheral portions of the image field, not to mention the performance required for the center of the image field. In the case of a general coaxial optical system, the sign of the ray height of extra-axial rays is inverted at a stop. Accordingly, if optical elements are not in symmetry with respect to the stop, off-axis aberrations are aggravated. For this reason, the common practice is to place refracting surfaces at respective positions facing each other across the stop, thereby obtaining a satisfactory symmetry with respect to the stop, and thus correcting off-axis aberrations.

Accordingly, the present invention adopts an arrangement in which two prisms are provided to obtain a satisfactory symmetry with respect to the stop, thereby enabling not only axial aberrations but also off-axis aberrations to be favorably corrected. If only one prism is provided, asymmetry with respect to the stop is enhanced, and off-axis aberrations are unavoidably aggravated.

For the reasons stated above, the present invention adopts a basic arrangement in which the image-forming optical system has a first prism and a second prism placed on the image side of the first prism and does not form an intermediate image. In addition, it is desirable that the image-forming optical system should be approximately telecentric on the image side.

Next, the arrangement of an image-forming optical system that is approximately telecentric on the image side will be described in detail.

As has been stated above, reflecting surfaces have a high decentration error sensitivity in comparison to refracting surfaces. Therefore, it is desirable to provide an arrangement of an optical system that is as independent of the high decentration error sensitivity as possible. In the case of a general coaxial optical system arranged to be approximately telecentric on the image side, because extra-axial principal rays are approximately parallel to the optical axis, the positional accuracy of the extra-axial rays is satisfactorily maintained on the image plane even if defocusing is effected. Therefore, the image-forming optical system according to the present invention is arranged to reflect the property of the above-described arrangement. In particular, to prevent the performance of an optical system using a reflecting surface, which has a relatively high decentration error sensitivity, from being deteriorated by focusing, it is desirable to adopt an arrangement in which the optical system is approximately telecentric on the image side, whereby the positional accuracy of extra-axial rays is maintained favorably.

Such an arrangement enables the present invention to be suitably applied to an image pickup optical system using an image pickup device, e.g. a CCD, in particular. Adopting the above-described arrangement minimizes the influence of the cosine fourth law. Accordingly, it is also possible to reduce shading.

As has been stated above, adopting the basic arrangement of the present invention makes it possible to obtain a compact image-forming optical system that has a smaller number of constituent optical elements than in the case of a refracting optical system and exhibits favorable performance throughout the image field, from the center to the periphery thereof.

In the image-forming optical system according to the present invention, the first prism has, in order from the object side thereof, a first surface through which a light beam enters the first prism, and a second surface that reflects the light beam in the first prism. The first prism further has a third surface that reflects the reflected light beam in the first prism, and a fourth surface through which the light beam exits from the first prism. At least one of the second and third surfaces of the first prism has a curved surface configuration that gives a power to a light beam. The curved surface configuration has a rotationally asymmetric surface configuration that corrects aberrations due to decentration. The second prism has, in order from the object side thereof, a first surface through which a light beam enters the second prism, and a second surface that reflects the light beam in the second prism. The second prism further has a third surface that reflects the reflected light beam in the second prism, and a fourth surface through which the light beam exits from the second prism. At least one of the second and third surfaces of the second prism has a curved surface configuration that gives a power to a light beam. The curved surface configuration has a rotationally asymmetric surface configuration that corrects aberrations due to decentration.

When a light ray from the object center that passes through the center of the stop and reaches the center of the image plane is defined as an axial principal ray, it is desirable that at least one reflecting surface in each prism should be decentered with respect to the axial principal ray. If at least one reflecting surface is not decentered with respect to the axial principal ray, the axial principal ray travels along the same optical path when incident on and reflected from the reflecting surface, and thus the axial principal ray is intercepted in the optical system undesirably. As a result, an image is formed from only a light beam whose central portion is shaded. Consequently, the center of the image is unfavorably dark, or no image is formed in the center of the image field.

It is also possible to decenter a reflecting surface with a power with respect to the axial principal ray.

When a reflecting surface with a power is decentered with respect to the axial principal ray, it is desirable that at least one of surfaces constituting a prism used in the present invention should be a rotationally asymmetric surface. It is particularly preferable from the viewpoint of aberration correction that at least one reflecting surface should be a rotationally asymmetric surface.

The reasons for adopting the above-described arrangements in the present invention will be described below in detail.

First, a coordinate system used in the following description and rotationally asymmetric surfaces will be described.

An optical axis defined by a straight line along which the axial principal ray travels until it intersects the first surface of the optical system is defined as a Z-axis. An axis perpendicularly intersecting the Z-axis in the decentration plane of each surface constituting the image-forming optical system is defined as a Y-axis. An axis perpendicularly intersecting the optical axis and also perpendicularly intersecting the Y-axis is defined as an X-axis. Ray tracing is forward ray tracing in which rays are traced from the object toward the image plane.

In general, a spherical lens system comprising only a spherical lens is arranged such that aberrations produced by spherical surfaces, such as spherical aberration, coma and curvature of field, are corrected with some surfaces by canceling the aberrations with each other, thereby reducing aberrations as a whole.

On the other hand, rotationally symmetric aspherical surfaces and the like are used to correct aberrations favorably with a minimal number of surfaces. The reason for this is to reduce various aberrations that would be produced by spherical surfaces.

However, in a decentered optical system, rotationally asymmetric aberrations due to decentration cannot be corrected by a rotationally symmetric optical system. Rotationally asymmetric aberrations due to decentration include distortion, curvature of field, and astigmatic and comatic aberrations, which occur even on the axis.

First, rotationally asymmetric curvature of field will be described. For example, when rays from an infinitely distant object point are incident on a decentered concave mirror, the rays are reflected by the concave mirror to form an image. In this case, the back focal length from that portion of the concave mirror on which the rays strike to the image surface is a half the radius of curvature of the portion on which the rays strike in a case where the medium on the image side is air. Consequently, as shown in FIG. 11, an image surface tilted with respect to the axial principal ray is formed. It is impossible to correct such rotationally asymmetric curvature of field by a rotationally symmetric optical system.

To correct the tilted curvature of field by the concave mirror M itself, which is the source of the curvature of field, the concave mirror M is formed from a rotationally asymmetric surface, and, in this example, the concave mirror M is arranged such that the curvature is made strong (refracting power is increased) in the positive direction of the Y-axis, whereas the curvature is made weak (refracting power is reduced) in the negative direction of the Y-axis. By doing so, the tilted curvature of field can be corrected. It is also possible to obtain a flat image surface with a minimal number of constituent surfaces by placing a rotationally asymmetric surface having the same effect as that of the above-described arrangement in the optical system separately from the concave mirror M.

It is preferable that the rotationally asymmetric surface should be a rotationally asymmetric surface having no axis of rotational symmetry in the surface nor out of the surface. If the rotationally asymmetric surface has no axis of rotational symmetry in the surface nor out of the surface, the degree of freedom increases, and this is favorable for aberration correction.

Next, rotationally asymmetric astigmatism will be described.

A decentered concave mirror M produces astigmatism even for axial rays, as shown in FIG. 12, as in the case of the above. The astigmatism can be corrected by appropriately changing the curvatures in the X- and Y-axis directions of the rotationally asymmetric surface as in the case of the above.

Rotationally asymmetric coma will be described below.

A decentered concave mirror M produces coma even for axial rays, as shown in FIG. 13, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

The image-forming optical system according to the present invention may also be arranged such that the above-described at least one surface having a reflecting action is decentered with respect to the axial principal ray and has a rotationally asymmetric surface configuration and further has a power. By adopting such an arrangement, decentration aberrations produced as the result of giving a power to the reflecting surface can be corrected by the surface itself. In addition, the power of the refracting surfaces of the prism is reduced, and thus chromatic aberration produced in the prism can be minimized.

The rotationally asymmetric surface used in the present invention should preferably be a plane-symmetry free-form surface having only one plane of symmetry. Free-form surfaces used in the present invention are defined by the following equation (a). It should be noted that the Z-axis of the defining equation is the axis of a free-form surface.

$$Z = cr^2 / \left[1 + \sqrt{\{1 - (1+k)c^2 r^2\}}\right] + \sum_{j=2}^{66} C_j X^m Y^n \quad (a)$$

In Eq. (a), the first term is a spherical surface term, and the second term is a free-form surface term.

In the spherical surface term:

c: the curvature at the vertex k: a conic constant $r = \sqrt{(X^2 + Y^2)}$

The free-form surface term is given by $$\sum_{j=2}^{66} C_j X^m Y^n$$

$= C_2 X + C_3 Y$
$+ C_4 X^2 + C_5 XY + C_6 Y^2$
$+ C_7 X^3 + C_8 X^2 Y + C_9 XY^2 + C_{10} Y^3$
$+ C_{11} X^4 + C_{12} X^3 Y + C_{13} X^2 Y^2 + C_{14} XY^3 + C_{15} Y^4$
$+ C_{16} X^5 + C_{17} X^4 Y + C_{18} X^3 Y^2 + C_{19} X^2 Y^3 + C_{20} XY^4 + C_{21} Y^5$
$+ C_{22} X^6 + C_{23} X^5 Y + C_{24} X^4 Y^2 + C_{25} X^3 Y^3 + C_{26} X^2 Y^4 + C_{27} XY^5 + C_{28} Y^6$
$+ C_{29} X^7 + C_{30} X^6 Y + C_{31} X^5 Y^2 + C_{32} X^4 Y^3 + C_{33} X^3 Y^4$
$+ C_{34} X^2 Y^5 + C_{35} XY^6 + C_{36} Y^7$ where $C_j$ (j is an integer of 2 or higher) are coefficients.

In general, the above-described free-form surface does not have planes of symmetry in both the XZ- and YZ-planes. In the present invention, however, a free-form surface having only one plane of symmetry parallel to the YZ-plane is obtained by making all terms with odd-numbered powers of X zero. For example, in the above defining equation (a), the coefficients of the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, . . . are set equal to zero. By doing so, it is possible to obtain a free-form surface having only one plane of symmetry parallel to the YZ-plane.

A free-form surface having only one plane of symmetry parallel to the XZ-plane is obtained by making all terms with odd-numbered powers of Y zero. For example, in the above defining equation (a), the coefficients of the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, . . . are set equal to zero. By doing so, it is possible to obtain a free-form surface having only one plane of symmetry parallel to the XZ-plane.

Furthermore, the direction of decentration is determined in correspondence to either of the directions of the above-described planes of symmetry. For example, with respect to the plane of symmetry parallel to the YZ-plane, the direction of decentration of the optical system is determined to be the Y-axis direction. With respect to the plane of symmetry parallel to the XZ-plane, the direction of decentration of the optical system is determined to be the X-axis direction. By doing so, rotationally asymmetric aberrations due to decentration can be corrected effectively, and at the same time, the productivity can be improved.

It should be noted that the above defining equation (a) is shown as merely an example, and that the feature of the present invention resides in that rotationally asymmetric aberrations due to decentration are corrected and, at the same time, the productivity is improved by using a rotationally asymmetric surface having only one plane of symmetry. Therefore, the same advantageous effect can be obtained for any other defining equation that expresses a rotationally asymmetric surface.

Incidentally, when the first prism is formed from two reflecting surfaces and two transmitting surfaces as stated above, the degree of freedom for aberration correction increases, and thus the amount of aberration produced in the first prism is minimized. In addition, because the relative decentration between the two reflecting surfaces is small, aberrations produced by the two reflecting surfaces are corrected with these reflecting surfaces by canceling the aberrations with each other. Therefore, the amount of aberration produced in the first prism is favorably small. It is more desirable that the two reflecting surfaces should have powers of different signs. By doing so, it is possible to enhance the effect of correcting each other's aberrations by the two reflecting surfaces and hence possible to obtain high resolution.

When the second prism is formed from two reflecting surfaces and two transmitting surfaces as in the case of the first prism, the degree of freedom for aberration correction increases, and thus the amount of aberration produced in the second prism is minimized. In addition, because the relative decentration between the two reflecting surfaces is small, aberrations produced by the two reflecting surfaces are corrected with these reflecting surfaces by canceling the aberrations with each other. Therefore, the amount of aberration produced in the second prism is favorably small. It is more desirable that the two reflecting surfaces should have powers of different signs. By doing so, it is possible to enhance the effect of correcting each other's aberrations by the two reflecting surfaces and hence possible to obtain high resolution.

It is preferable to minimize the relative decentration between the first and second reflecting surfaces at points where the optical axis is reflected by the two reflecting surfaces. By doing so, it becomes possible to reduce the amount of decentration aberrations produced from the prism, and the amount of rotationally asymmetric aberrations produced from the prism reduces.

In the present invention it is important to arrange the image-forming optical system so that any optical element that gives a refracting power contributing to the image-forming action of a light beam is not placed between the second prism and an image formed by the image-forming optical system.

Regarding the reduction in the thickness of an image-forming optical system using prisms, when a device that is used to receive an image formed by the image-forming optical system is an electronic image pickup device, e.g. a CCD, in particular, it is necessary to insert a low-pass filter, an infrared cutoff filter, etc. Therefore, if a lens or the like other than such filters is interposed between the second prism and the image plane, the thickness increases correspondingly. This unfavorably weakens the present invention's effect of achieving a compact image-forming optical system by folding the optical path through a prism optical system.

In addition, it is desirable in the present invention to arrange the second prism such that the axial principal ray that is led from the third surface of the second prism to the fourth surface of the second prism lies closer to the axial principal ray that is led from the third surface of the first prism to the fourth surface of the first prism than the axial principal ray of the light beam incident on the first prism that is led from the first surface of the first prism to the second surface of the first prism and the extension of this axial principal ray.

FIG. 16 shows one form of the image-forming optical system according to the present invention. As illustrated in the figure, the second prism 20 is arranged such that the axial principal ray h that is led from the third surface 23 of the second prism 20 to the fourth surface 24 of the second prism 20 lies closer to the axial principal ray g that is led from the third surface 13 of the first prism 10 to the fourth surface 14 of the first prism 10 than the axial principal ray f of the light beam incident on the first prism 10 that is led from the first surface 11 of the first prism 10 to the second surface 12 of the first prism 10 and the extension (dashed line) of the axial principal ray f. With this arrangement, the positional relationship between the first prism 10, the second prism 20 and the image plane 3 can be changed from a straight-line parallel relationship such as that shown in FIG. 17 to a positional relationship in which, as shown in FIG. 16, the first prism 10 faces the second prism 20 in a direction oblique to the horizontal direction as viewed in FIG. 16 (in the case of FIG. 16, the first prism 10 faces the second prism 20 in an obliquely right upward direction). Accordingly, it is possible to realize a reduction in the thickness of the image-forming optical system in comparison to the arrangement in which the constituent elements of the image-forming optical system are disposed in parallel in a straight line as shown in FIG. 17. In particular, to realize an image-forming optical system of wide field angle, it is necessary to increase the size of the first prism 10, which is placed on the object side, in order to ensure the sufficiently large beam width. That is, it is necessary to increase the size of the first surface 11 as an entrance surface, the size of the second surface 12 as a reflecting surface for turning back the incident light beam, and the surface separation between the first and second surfaces 11 and 12. Consequently, the first prism 10 becomes large and thick as a whole (this is particularly noticeable at a portion thereof closer to the entrance surface). Therefore, if the second prism 20, together with the image plane 3, is placed in parallel to the first prism 10 in a straight line, it is necessary to provide a space for placing the second prism 20 in a direction in which the thickness further increases. This goes against the demand to achieve a compact image-forming optical system. Accordingly, it is desirable from the viewpoint of achieving a compact image-forming optical system to place the second prism 20 in an oblique positional relation to a structural portion of the first prism 10 that extends from the first surface 11 to the second surface 12, as stated above.

In addition, it is desirable in the present invention to arrange the first and second prisms as follows. The fourth surface of the first prism and the first surface of the second prism face each other. The third surface of the second prism does not face the second surface of the first prism but lies closer to the fourth surface of the first prism than the second surface of the first prism. Consequently, the first and second surfaces of the first prism and the third and fourth surfaces of the second prism and further the image plane do not lie in parallel on a line extending straight from the axial principal ray entering the first prism. The third and fourth surfaces of the second prism and the image plane are off the line extending straight from the axial principal ray entering the first prism.

As shown in FIG. 16, the fourth surface 14 of the first prism 10 and the first surface 21 of the second prism 20 face each other. The third surface 23 of the second prism 20 does not face the second surface 12 of the first prism 10 but lies closer to the fourth surface 14 of the first prism 10 than the second surface 12 of the first prism 10. Consequently, the first and second surfaces 11 and 12 of the first prism 10 and the third and fourth surfaces 23 and 24 of the second prism 20 and further the image plane 3 do not lie in parallel on a line extending straight from the axial principal ray a entering the first prism 10. The third and fourth surfaces 23 and 24 of the second prism 20 and the image plane 3 are off the line extending straight from the axial principal ray a entering the first prism 10. With this arrangement, the positional relationship between the first prism 10, the second prism 20 and the image plane 3 can be changed from a straight-line parallel relationship such as that shown in FIG. 17 to a positional relationship in which, as shown in FIG. 16, the first prism 10 faces the second prism 20 in a direction oblique to the horizontal direction as viewed in FIG. 16 (in the case of FIG. 16, the first prism 10 faces the second prism 20 in an obliquely right upward direction). Accordingly, it is possible to realize a reduction in the thickness of the image-forming optical system in comparison to the arrangement in which the constituent elements of the image-forming optical system are disposed in parallel in a straight line as shown in FIG. 17. In particular, to realize an image-forming optical system of wide field angle, it is necessary to increase the size of the first prism 10, which is placed on the object side, in order to ensure the sufficiently large beam width. That is, it is necessary to increase the size of the first surface 11 as an entrance surface, the size of the second surface 12 as a reflecting surface for turning back the incident light beam, and the surface separation between the first and second surfaces 11 and 12. Consequently, the first prism 10 becomes large and thick as a whole (this is particularly noticeable at a portion thereof closer to the entrance surface). Therefore, if the second prism 20, together with the image plane 3, is placed in parallel to the first prism 10 in a straight line, it is necessary to provide a space for placing the second prism 20 in a direction in which the thickness further increases. This goes against the demand to achieve a compact image-forming optical system. Accordingly, it is desirable from the viewpoint of achieving a compact image-forming optical system to place the second prism 20 in an oblique positional relation to a structural portion of the first prism 10 that extends from the first surface 11 to the second surface 12, as stated above.

It is desirable to arrange the first prism such that the first and fourth surfaces thereof face each other across the prism medium, and the second and third surfaces thereof face each other across the medium, thereby forming a Z-shaped optical path, and to arrange the second prism such that the first and fourth surfaces thereof face each other across the prism medium, and the second and third surfaces thereof face each other across the medium, thereby forming a Z-shaped optical path.

It is desirable from the viewpoint of design and aberration correcting performance to arrange the first and second prisms so that the optical path in each prism is formed in a Z-shape (including an optical path in the form of a mirror image of a Z-shape, a zigzag optical path bent at acute angles, and a zigzag optical path bent at obtuse angles), thereby preventing any portions of the optical path from intersecting each other. By doing so, in the first prism, the incidence and exit directions of the axial principal ray as reflected at the second surface are opposite to those of the axial principal ray as reflected at the third surface. In the second prism also, the incidence and exit directions of the axial principal ray as reflected at the second surface are opposite to those of the axial principal ray as reflected at the third surface. Therefore, it is easy to make aberration correction.

It is desirable to arrange the first prism such that the first surface, which is a transmitting surface through which a light beam enters the first prism, and the fourth surface, which is a transmitting surface through which the light beam exits from the first prism, are not adjacent to each other but in a positional relationship in which a reflecting surface lies between the first and fourth surfaces, and to arrange the second prism such that the first surface, which is a transmitting surface through which a light beam enters the second prism, and the fourth surface, which is a transmitting surface through which the light beam exits from the second prism, are not adjacent to each other but in a positional relationship in which a reflecting surface lies between the first and fourth surfaces.

By arranging the first and second prisms as stated above, the angle of reflection in each prism can be made gentle in comparison to a prism of the type in which the entrance and exit surfaces are adjacent to each other. Accordingly, the aggravation of aberrations is reduced, and the degree of design freedom increases. It should be noted that the term "the entrance and exit surfaces are adjacent to each other" is concerned with the positional relationship between only optical surfaces such as transmitting surfaces and reflecting surfaces. The same is the case with the above-mentioned "positional relationship in which a reflecting surface lies between the first and fourth surfaces". That is, even when there is a chamfered portion without an optical action or a ghost or flare preventing coating surface between two transmitting surfaces or between a transmitting surface and a reflecting surface, these two surfaces are regarded as adjacent to each other unless an optical surface having an optical action is present therebetween.

In addition, it is desirable that the optical path length for the axial principal ray from the first to fourth surfaces of the first prism should be longer than the optical path length for the axial principal ray from the first to fourth surfaces of the second prism.

By adopting the above-described arrangement, the size of the second prism can be made smaller than the size of the first prism. Accordingly, even when the first prism increases in size as the result of widening the field angle, the image-forming optical system can be made compact in size as a whole by reducing the size of the second prism.

In this case, it is desirable for the first and second prisms to satisfy the following condition:

$$0.10 < L2/L1 < 0.85 \qquad (1)$$

where L1 is the optical path length for the axial principal ray from the first to fourth surfaces of the first prism, and L2 is the optical path length for the axial principal ray from the first to fourth surfaces of the second prism.

If L2/L1 is not larger than the lower limit of the condition (1), i.e. 0.10, the second prism becomes excessively small in size and hence difficult to produce. Alternatively, the first prism becomes excessively large in size. This goes against the demand to achieve a compact image-forming optical system. If L2/L1 is not smaller than the upper limit, i.e. 0.85, it becomes difficult to construct a second prism that is sufficiently compact relative to the first prism.

It is more desirable to satisfy the following condition:

$$0.10 < L2/L1 < 0.70 \qquad (1\text{-}1)$$

It is even more desirable to satisfy the following condition:

$$0.20 < L2/L1 < 0.70 \qquad (1\text{-}2)$$

It is still more desirable to satisfy the following condition:

$$0.20 < L2/L1 < 0.60 \qquad (1\text{-}3)$$

It is still more desirable to satisfy the following condition:

$$0.20 < L2/L1 < 0.50 \qquad (1\text{-}4)$$

It is still more desirable to satisfy the following condition:

$$0.20 < L2/L1 < 0.40 \qquad (1\text{-}5)$$

In addition, by giving a negative refracting power to the first prism, a wide field angle for imaging can be obtained. This is because the negative power enables rays of wide field angle to be converged and thus it is possible to converge the light beam when the rays enter the second unit, which is formed from the second prism. This is favorable from the viewpoint of aberration correction when an optical system having a relatively short focal length is to be constructed.

It is preferable to place the stop on the image side of the first prism. By doing so, in a case where the first reflecting surface has a negative power and is approximated by a spherical surface, the center of curvature of the first reflecting surface and the stop position are approximately coincident with each other. Therefore, it is possible to eliminate comatic aberration in theory.

Regarding the configuration each prism surface, it is desirable that both the second and third surfaces of the first prism should be arranged to have a rotationally asymmetric surface configuration that gives a power to a light beam and corrects aberrations due to decentration.

It is also desirable that both the second and third surfaces of the second prism should be arranged to have a rotationally asymmetric surface configuration that gives a power to a light beam and corrects aberrations due to decentration.

It is desirable that the rotationally asymmetric surface configuration of at least one of the second and third surfaces of the first prism should be arranged in the form of a plane-symmetry free-form surface having only one plane of symmetry.

It is also desirable that the rotationally asymmetric surface configuration of at least one of the second and third surfaces of the second prism should be arranged in the form of a plane-symmetry free-form surface having only one plane of symmetry.

It is desirable that the rotationally asymmetric surface configurations of both the second and third surfaces of the first prism should be arranged in the form of a plane-symmetry free-form surface having only one plane of symmetry.

It is also desirable that the rotationally asymmetric surface configurations of both the second and third surfaces of the second prism should be arranged in the form of a plane-symmetry free-form surface having only one plane of symmetry.

It is desirable that the first prism should be arranged such that the only one plane of symmetry of the plane-symmetry free-form surface that forms the second surface of the first prism and the only one plane of symmetry of the plane-symmetry free-form surface that forms the third surface of the first prism are formed in the same plane.

It is also desirable that the second prism should be arranged such that the only one plane of symmetry of the plane-symmetry free-form surface that forms the second surface of the second prism and the only one plane of symmetry of the plane-symmetry free-form surface that forms the third surface of the second prism are formed in the same plane.

It is desirable to arrange the first and second prisms so that the only one plane of symmetry of each of the plane-symmetry free-form surfaces that form the second and third surfaces of the first prism and the only one plane of symmetry of each of the plane-symmetry free-form surfaces that form the second and third surfaces of the second prism are formed in the same plane.

It is desirable to arrange the first prism such that at least one of the first and fourth surfaces thereof has a rotationally asymmetric surface configuration that gives a power to a light beam and corrects aberrations due to decentration. A refracting surface having such a surface configuration is effective in correcting aberrations due to decentration.

It is desirable that the rotationally asymmetric surface configuration of at least one of the first and fourth surfaces in the first prism should be arranged in the form of a plane-symmetry free-form surface having only one plane of symmetry.

It is desirable to arrange the second prism such that at least one of the first and fourth surfaces thereof has a rotationally asymmetric surface configuration that gives a power to a light beam and corrects aberrations due to decentration. A refracting surface having such a surface configuration is effective in correcting aberrations due to decentration.

It is desirable that the rotationally asymmetric surface configuration of at least one of the first and fourth surfaces in the second prism should be arranged in the form of a plane-symmetry free-form surface having only one plane of symmetry.

In the present invention, the effective way of enhancing the symmetry required for the image-forming optical system and thereby favorably correcting aberrations, including off-axis aberrations, is to place a pupil between the first and second prisms and to place the second prism between the pupil and the image plane.

In this case, it is desirable to place the stop on the pupil.

In the present invention, it is desirable for the image-forming optical system to have a first prism having a diverging action on the object side of the stop and a second prism having a converging action on the image side of the stop, and also desirable for the image-forming optical system to be approximately telecentric on the image side.

In an image-forming optical system using a refracting optical element, the power distribution varies according to the use application. For example, telephoto systems having a narrow field angle generally adopt an arrangement in which the entire system is formed as a telephoto type having a positive front unit and a negative rear unit, thereby making the overall length of the optical system shorter than the focal length. Wide-angle systems having a wide field angle generally adopt an arrangement in which the entire system is formed as a retrofocus type having a negative front unit and a positive rear unit, thereby making the back focus longer than the focal length.

In the case of an image-forming optical system using an image pickup device, e.g. a CCD, in particular, it is necessary to place an optical low-pass filter or an infrared cutoff filter between the image-forming optical system and the image pickup device to remove moire or to eliminate the influence of infrared rays. Therefore, with a view to ensuring a space for placing these optical members, it is desirable to adopt a retrofocus type arrangement for the image-forming optical system.

It is important for a retrofocus type image-forming optical system to be corrected for aberrations, particularly off-axis aberrations. The correction of off-axis aberrations depends largely on the position of the stop. As has been stated above, in the case of a general coaxial optical system, off-axis aberrations are aggravated if optical elements are not in symmetry with respect to the stop. For this reason, the common practice is to place optical elements of the same sign at respective positions facing each other across the stop, thereby obtaining a satisfactory symmetry with respect to the stop, and thus correcting off-axis aberrations. In the case of a retrofocus type system having a negative front unit and a positive rear unit, the power distribution is asymmetric in the first place. Therefore, the off-axis aberration-correcting performance varies to a considerable extent according to the position of the stop.

Therefore, the stop is placed between the object-side, first prism having a diverging action and the image-side, second prism having a converging action, thereby making it possible to minimize the aggravation of off-axis aberrations due to the asymmetry of the power distribution. If the stop is placed on the object side of the object-side diverging prism or on the image side of the image-side converging prism, the asymmetry with respect to the stop is enhanced and becomes difficult to correct.

In this case, the image-forming optical system may consist of the first prism of diverging action placed on the object side of the stop and the second prism of converging action placed on the image side of the stop. That is, the image-forming optical system may be formed from these prisms alone.

In the image-forming optical system according to the present invention, there is only one image-formation plane throughout the system. As has been stated above, the decentration error sensitivity of a reflecting surface is higher than that of a refracting surface. In a reflecting optical member arranged in the form of a single block as in the case of a prism, surface accuracy errors and decentration errors of each surface are transferred while being added up. Therefore, the smaller the number of reflecting surfaces, the more the manufacturing accuracy required for each surface is eased. Accordingly, it is undesirable to increase the number of reflections more than is needed. For example, in an image-forming optical system in which an intermediate image is formed and this image is relayed, the number of reflections increases more than is needed, and the manufacturing accuracy required for each surface becomes tight, causing the cost to increase unfavorably.

It is preferable that the axial principal ray entering the second prism and the axial principal ray exiting therefrom should be approximately parallel to each other. This is because if the incident and emergent axial principal rays are approximately parallel to each other, focusing can be performed by moving the second prism linearly along the optical axis.

Let us define the power of a decentered optical system and that of an optical surface. As shown in FIG. 15, when the direction of decentration of a decentered optical system S is taken in the Y-axis direction, a light ray which is parallel to the axial principal ray of the decentered optical system S and which has a small height d in the YZ-plane is made to enter the decentered optical system S from the object side thereof. The angle that is formed between that ray and the axial principal ray exiting from the decentered optical system S as the two rays are projected onto the YZ-plane is denoted by δy, and δy/d is defined as the power Py in the Y-axis direction of the decentered optical system S. Similarly, a light ray which is parallel to the axial principal ray of the decentered optical system S and which has a small height d in the X-axis direction, which is perpendicular to the YZ-plane, is made to enter the decentered optical system S from the object side thereof. The angle that is formed between that ray and the axial principal ray exiting from the decentered optical system S as the two rays are projected onto a plane perpendicularly intersecting the YZ-plane and containing the axial principal ray is denoted by δx, and δx/d is defined as the power Px in the X-axis direction of the decentered optical system S. The power Pyn in the Y-axis direction and power Pxn in the X-axis direction of a decentered optical surface n constituting the decentered optical system S are defined in the same way as the above.

Furthermore, the reciprocals of the above-described powers are defined as the focal length Fy in the Y-axis direction of the decentered optical system S, the focal length Fx in the X-axis direction of the decentered optical system S, the focal length Fyn in the Y-axis direction of the decentered optical surface n, and the focal length Fxn in the X-axis direction of the decentered optical surface n, respectively.

The relationship between the power of each surface and the power of the entire optical system will be described below. The value obtained by dividing the power of the second surface of the first prism by the power of the entire optical system is denoted by Pxs3/Px for the X-axis direction and Pys3/Py for the Y-axis direction. The value obtained by dividing the power of the third surface of the first prism by the power of the entire optical system is denoted by Pxs4/Px for the X-axis direction and Pys4/Py for the Y-axis direction. The value obtained by dividing the power of the second surface of the second prism by the power of the entire optical system is denoted by Pxs10/Px for the X-axis direction and Pys10/Py for the Y-axis direction. It is desirable that both Pxs3/Px and Pys3/Py should be negative. By giving a relatively strong negative power to the second surface of the first prism, it is possible to converge rays of wide field angle in the optical system and hence possible to reduce the size of the prism. Of the reflecting surfaces in the first prism, the second surface is closest to the object side. In a case where a retrofocus type optical system is formed by using negative and positive units, aberrations produced in each unit are reduced and aberrations produced in the entire optical system are also reduced by increasing the spacing between the front unit, which is a negative unit, and the rear unit, which is a positive unit. Therefore, it is desirable to increase the negative power of the second surface, which is a reflecting surface closest to the object side in the first prism. Non-decentered optical systems suffer from the problem that the overall length becomes unavoidably long. In an optical system that is decentered and has a folded optical path as in the present invention, the overall size of the optical system can be reduced even when the overall length along the optical axis increases.

It is more desirable to satisfy at least one of the following conditions:

$$-2 < Pxs3/Px < 0 \tag{2}$$

$$-2 < Pys3/Py < 0 \tag{3}$$

If Pxs3/Px or Pys3/Py is not larger than the lower limit, i.e. −2, the negative power of the second surface of the first prism becomes excessively strong. Accordingly, to obtain a predetermined power with the entire optical system, the load imposed on another surface having a positive power must be increased. Consequently, it becomes impossible for the optical system to maintain a favorable aberration correction condition as a whole. If Pxs3/Px or Pys3/Py is not smaller than the upper limit, i.e. 0, the negative power of the second surface of the first prism becomes excessively weak. Consequently, the light beam-converging action weakens, and the overall size of the optical system becomes unfavorably large.

It is even more desirable to satisfy at least one of the following conditions:

$$-1 < Pxs3/Px < -0.02 \tag{2-1}$$

$$-1 < Pys3/Py < -0.02 \tag{3-1}$$

The meaning of the upper and lower limits of each of the conditions (2-1) and (3-1) is the same as the above.

It is still more desirable to satisfy at least one of the following conditions:

$$-0.7 < Pxs3/Px < -0.4 \tag{2-2}$$

$$-0.7 < Pys3/Py < -0.4 \tag{3-2}$$

The meaning of the upper and lower limits of each of the conditions (2-2) and (3-2) is the same as the above.

It is desirable that both Pxs4/Px and Pys4/Py should be positive. When the third surface of the first prism is provided with a relatively strong positive power, it forms a positive rear unit of a retrofocus type optical system. In the first prism of the present invention, the first surface and the third surface are not placed at the same position and not provided with the same configuration. Therefore, the first surface and third surface of the first prism can be arranged as different surfaces, which are optically separate from each other. Accordingly, even if the third surface of the first prism is formed as a reflecting surface of strong positive power, decentration aberrations can be minimized.

It is even more desirable to satisfy at least one of the following conditions:

$$0 < Pxs4/Px < 2 \tag{4}$$

$$0 < Pys4/Py < 2 \tag{5}$$

If Pxs4/Px or Pys4/Py is not larger than the lower limit, i.e. 0, the positive power of the third surface of the first prism becomes excessively weak. Accordingly, to obtain a predetermined power with the entire optical system, the load imposed on another surface having a positive power must be increased. Consequently, it becomes impossible for the optical system to maintain a favorable aberration correction condition as a whole. If Pxs4/Px or Pys4/Py is not smaller than the upper limit, i.e. 2, the positive power of the third surface of the first prism becomes excessively strong. Consequently, the power assigned to this surface increases excessively, and aberrations, including decentration aberrations, produced by this surface become excessively large and hence impossible to correct by another surface.

It is still more desirable to satisfy at least one of the following conditions:

$$0.1 < Pxs4/Px < 1 \tag{4-1}$$

$$0.1 < Pys4/Py < 1 \tag{5-1}$$

The meaning of the upper and lower limits of each of the conditions (4-1) and (5-1) is the same as the above.

It is still more desirable to satisfy at least one of the following conditions:

$$0.3 < Pxs4/Px < 0.8 \quad (4\text{-}2)$$

$$0.3 < Pys4/Py < 0.8 \quad (5\text{-}2)$$

The meaning of the upper and lower limits of each of the conditions (4-2) and (5-2) is the same as the above.

By increasing the surface separation between the second and third surfaces of the first prism, it is possible to reduce aberrations produced in the entire optical system when it is arranged in the form of a retrofocus type optical system. Assuming that the optical path length for the axial principal ray between the second and third surfaces of the first prism (the optical path length being obtained by multiplying the distance between the surfaces by the refractive index) is S3–S4 and the focal length in the X-axis direction of the entire optical system is Fx, it is desirable for (S3–S4)/Fx to satisfy the following condition:

$$1 < (S3-S4)/Fx < 20 \quad (6)$$

This condition is equivalent to the spacing between the front and rear units of the above-described retrofocus type optical system, which has negative and positive units. If (S3–S4)/Fx is not larger than the lower limit, i.e. 1, the negative and positive powers of the two surfaces become excessively strong, and it becomes impossible to correct aberrations in the entire optical system, If (S3–S4)/Fx is not smaller than the upper limit, i.e. 20, the surface separation between the second and third surfaces of the first prism becomes excessively large. Consequently, the overall size of the optical system becomes unfavorably large even if the optical system has a folded optical path.

It is even more desirable to satisfy the following condition:

$$2 < (S3-S4)/Fx < 15 \quad (6\text{-}1)$$

The meaning of the upper and lower limits of the condition (6-1) is the same as the above.

It is still more desirable to satisfy the following condition:

$$3 < (S3-S4)/Fx < 9 \quad (6\text{-}2)$$

The meaning of the upper and lower limits of the condition (6-2) is the same as the above.

The following is a description of the power of the second surface of the second prism. This surface is placed relatively close to the stop and therefore aggravates relatively little aberrations in the peripheral image. Accordingly, it is possible to give a strong positive power to the second surface of the second prism. For this reason, favorable image-formation performance can be obtained by giving a relatively strong positive power to the second surface of the second prism although this surface has a large amount of displacement.

In addition, it is desirable to satisfy at least one of the following conditions:

$$0 < Pxs10/Px < 3 \quad (7)$$

$$0 < Pys10/Py < 3 \quad (8)$$

If Pxs10/Px or Pys10/Py is not larger than the lower limit, i.e. 0, the positive power becomes excessively weak. Accordingly, a positive power must be assigned to another surface having a large amount of displacement. Consequently, decentration aberrations become large and impossible to correct favorably. If Pxs10/Px or Pys10/Py is not smaller than the upper limit, i.e. 3, the positive power of the second surface of the second prism becomes excessively strong. Consequently, aberrations produced by the second surface of the second prism becomes excessively large and hence difficult to correct by another surface.

It is even more desirable to satisfy at least one of the following conditions:

$$0.1 < Pxs10/Px < 2 \quad (7\text{-}1)$$

$$0.1 < Pys10/Py < 2 \quad (8\text{-}1)$$

The meaning of the upper and lower limits of each of the conditions (7-1) and (8-1) is the same as the above.

It is still more desirable to satisfy at least one of the following conditions:

$$0.2 < PXs10/Px < 1 \quad (7\text{-}2)$$

$$0.2 < Pys10/Py < 1 \quad (8\text{-}2)$$

The meaning of the upper and lower limits of each of the conditions (7-2) and (8-2) is the same as the above.

When a ray that is emitted from the object center and passes through the center of the stop to reach the center of the image is defined as an axial principal ray, it is necessary that the incident angle (shown by $\theta$ in FIG. 16) of the axial principal ray as reflected by the third surface of the first prism should satisfy the following condition in order to reduce the thickness of the optical system in the direction of the optical axis:

$$10° < S4\theta < 60° \quad (9)$$

where $S4\theta$ denotes the angle of incidence of the axial principal ray on the third surface of the first prism.

If $S4\theta$ is not larger than the lower limit of the condition (9), i.e. 10°, the incident angle becomes small, so that the second prism and the first prism undesirably overlap each other. Consequently, it becomes impossible to construct the first prism itself. If $S4\theta$ is not smaller than the upper limit, i.e. 60°, the amount of displacement becomes excessively large, and decentration aberrations produced by this surface become large and impossible to correct by another surface.

It is more desirable to satisfy the following condition:

$$20° < S4\theta < 50° \quad (9\text{-}1)$$

The meaning of the upper and lower limits of the condition (9-1) is the same as the above.

It is still more desirable to satisfy the following condition:

$$30° < S4\theta < 40° \quad (9\text{-}2)$$

The meaning of the upper and lower limits of the condition (9-2) is the same as the above.

In the image-forming optical system according to the present invention, focusing of the image-forming optical system can be effected by moving all the constituent elements or moving only one prism. However, it is also possible to effect focusing by moving the image-formation plane in the direction of the axial principal ray exiting from the surface closest to the image side. By doing so, it is possible to prevent displacement of the axial principal ray on the entrance side due to focusing even if the direction in which the axial principal ray from the object enters the optical system is not coincident with the direction of the axial principal ray exiting from the surface closest to the image side owing to the decentration of the image-forming optical system. It is also possible to effect focusing by moving a plurality of wedge-shaped prisms, which are formed by dividing a plane-parallel plate, in a direction perpendicular to the Z-axis. In this case also, focusing can be performed independently of the decentration of the image-forming optical system.

In the image-forming optical system according to the present invention, if at least one prism is formed by using an organic material such as a plastic material, the cost can be reduced. It is desirable to use a material of low moisture absorption, such as amorphous polyolefin, because such a material has a minimum change in image-forming performance with changes in moisture.

In the present invention, temperature compensation can be made by using a diverging prism and a converging prism. By providing the prisms with powers of different signs, it is possible to prevent the focal shift due to changes in temperature, which is a problem arising when a plastic material is used to form a prism.

In the present invention, it is desirable that each of a plurality of prisms should have a positioning portion for setting a relative position, which is provided on a surface having no optical action. In a case where a plurality of prisms each having a reflecting surface with a power are provided as in the present invention in particular, relative displacement of each prism causes the performance to be deteriorated. Therefore, in the present invention, a positioning portion for setting a relative position is provided on each surface of each prism that has no optical action, thereby ensuring the required positional accuracy. Thus, the desired performance can be ensured. In particular, if a plurality of prisms are integrated into one unit by using the positioning portions and coupling members, it becomes unnecessary to assemble and adjust a plurality of prisms which would otherwise be separate from each other. Accordingly, the cost can be further reduced.

Furthermore, the optical path can be folded in a direction different from the decentration direction of the image-forming optical system according to the present invention by placing a reflecting optical member, e.g. a mirror, on the object side of the entrance surface of the image-forming optical system. By doing so, the degree of freedom for layout of the image-forming optical system further increases, and the overall size of the image-forming optical apparatus can be further reduced.

In the present invention, the image-forming optical system can be formed from prisms alone. By doing so, the number of components is reduced, and the cost is lowered. Furthermore, a plurality of prisms may be integrated into one prism at each of the front and back sides of the stop. By doing so, the cost can be further reduced.

In the present invention, the image-forming optical system may include another lens (positive or negative lens) as a constituent element in addition to the first and second prisms at one or each of a plurality of positions selected from a position on the object side of the first and second prisms, a position between the two prisms, and a position on the image side of the two prisms.

The image-forming optical system according to the present invention may be a fast, single focal length lens system. Alternatively, the image-forming optical system may be arranged in the form of a zoom lens system (variable-magnification image-forming optical system) by combining it with a single or plurality of refracting optical systems that may be provided between the two prisms or on the object or image side of the two prisms.

In the present invention, the refracting and reflecting surfaces of the image-forming optical system may be formed from spherical surfaces or rotationally symmetric aspherical surfaces.

In a case where the above-described image-forming optical system according to the present invention is placed in an image pickup part of an image pickup apparatus, or in a case where the image pickup apparatus is a photographic apparatus having a camera mechanism, it is possible to adopt an arrangement in which a prism member provided in the front unit is placed closest to the object side among optical elements having an optical action, and the entrance surface of the prism member is decentered with respect to the optical axis, and further a cover member is placed on the object side of the prism member at right angles to the optical axis. The arrangement may also be such that the prism member provided in the front unit has on the object side thereof an entrance surface decentered with respect to the optical axis, and a cover lens having a power is placed on the object side of the entrance surface of the prism member in coaxial relation to the optical axis so as to face the entrance surface across an air spacing.

If a prism member is placed closest to the object side and a decentered entrance surface is provided on the front side of a photographic apparatus as stated above, the obliquely tilted entrance surface is seen from the subject, and it gives the illusion that the photographic center of the apparatus is deviated from the subject when the entrance surface is seen from the subject side. Therefore, a cover member or a cover lens is placed at right angles to the optical axis, thereby preventing the subject from feeling incongruous when seeing the entrance surface, and allowing the subject to be photographed with the same feeling as in the case of general photographic apparatus.

A finder optical system can be formed by using any of the above-described image-forming optical systems according to the present invention as a finder objective optical system and adding an image-inverting optical system for erecting an object image formed by the finder objective optical system and an ocular optical system.

In addition, it is possible to construct a camera apparatus by using the finder optical system and an objective optical system for photography provided in parallel to the finder optical system.

In addition, an image pickup optical system can be constructed by using any of the foregoing image-forming optical systems according to the present invention and an image pickup device placed in an image plane formed by the image-forming optical system.

In addition, a camera apparatus can be constructed by using any of the foregoing image-forming optical systems according to the present invention as an objective optical system for photography, and a finder optical system placed in an optical path separate from an optical path of the objective optical system for photography or in an optical path branched from the optical path of the objective optical system for photography.

In addition, an electronic camera apparatus can be constructed by using any of the foregoing image-forming optical systems according to the present invention, an image pickup device placed in an image plane formed by the image-forming optical system, a recording medium for recording image information received by the image pickup device, and an image display device that receives image information from the recording medium or the image pickup device to form an image for observation.

In addition, an endoscope system can be constructed by using an observation system having any of the foregoing image-forming optical systems according to the present invention and an image transmitting member for transmitting an image formed by the image-forming optical system along a longitudinal axis, and an illumination system having an illuminating light source and an illuminating light transmitting member for transmitting illuminating light from the illuminating light source along the longitudinal axis.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 3 of the image-forming optical system according to the present invention will be described below. It should be noted that constituent parameters of each example will be shown later.

Figure 1:
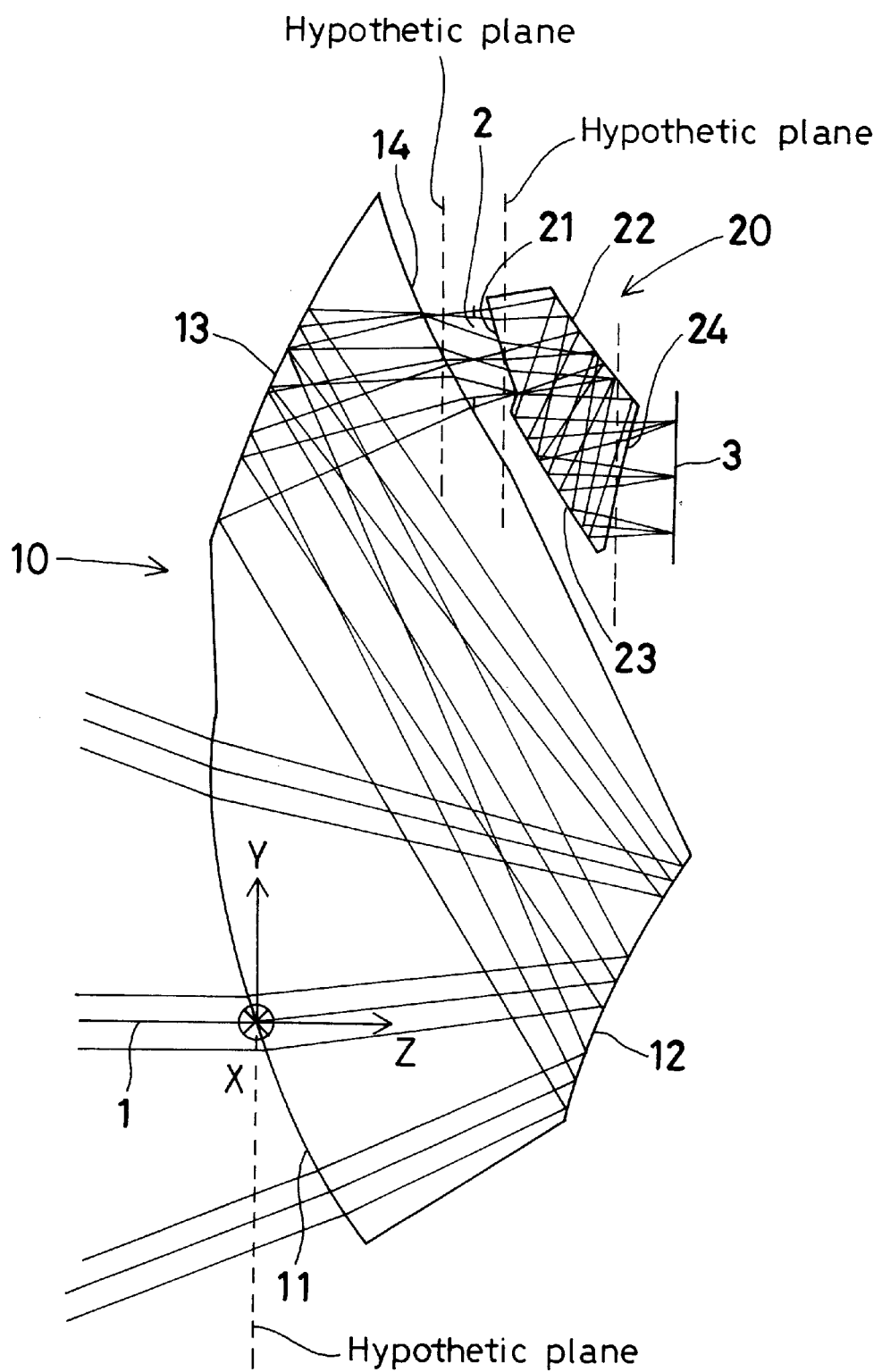
FIG. 1 is a sectional view of an image-forming optical system according to Example 1 of the present invention.

In each example, as shown in FIG. 1, an axial principal ray 1 is defined by a ray emanating from the center of an object and passing through the center of a stop 2 to reach the center of an image plane 3. A hypothetic plane is taken in the plane extending through the intersection between the axial principal ray 1 and the entrance surface (first surface) 11 of the first prism 10 at right angles to the axial principal ray 1 entering the entrance surface 11. Another hypothetic plane is taken in the plane extending through the intersection between the axial principal ray 1 and the exit surface (fourth surface) 14 of the first prism 10 at right angles to the axial principal ray 1 exiting from the exit surface 14. Another hypothetic plane is taken in the plane extending through the intersection between the axial principal ray 1 and the entrance surface (first surface) 21 of the second prism 20 at right angles to the axial principal ray 1 entering the entrance surface 21. Another hypothetic plane is taken in the plane extending through the intersection between the axial principal ray 1 and the exit surface (fourth surface) 24 of the second prism 20 at right angles to the axial principal ray 1 exiting from the exit surface 24. The intersection of each hypothetic plane and the associated optical surface is defined as the origin for this optical surface and decentered optical surfaces present between it and the subsequent hypothetic plane (the image plane in the case of the final hypothetic plane). A positive direction of a Z-axis is taken in the direction of travel of the axial principal ray 1 (the axial principal ray 1 entering the entrance surface in the case of the hypothetic plane determined with respect to the intersection of each entrance surface; the axial principal ray 1 exiting from the exit surface in the case of the hypothetic plane determined with respect to the intersection of each exit surface). A plane containing the Z-axis and the center of the image plane is defined as a YZ-plane. An axis extending through the origin at right angles to the YZ-plane is defined as an X-axis. The direction in which the X-axis extends from the obverse side toward the reverse side of the plane of the figure is defined as a positive direction of the X-axis. An axis that constitutes a right-handed orthogonal coordinate system in combination with the X- and Z-axes is defined as a Y-axis. FIG. 1 shows the hypothetic planes and a coordinate system concerning the hypothetic plane determined with respect to the intersection of the entrance surface 11 of the first prism 10. Illustration of the hypothetic planes and the coordinate system is omitted in FIGS. 2 and 3.

In Example 1 to 3, the decentration of each surface is made in the YZ-plane, and the one and only plane of symmetry of each rotationally asymmetric free-form surface is the YZ-plane.

Regarding decentered surfaces, each surface is given displacements in the X-, Y- and Z-axis directions (X, Y and Z, respectively) of the vertex position of the surface from the origin of the associated coordinate system, and tilt angles (degrees) of the center axis of the surface [the Z-axis of the above equation (a) in regard to free-form surfaces; the Z-axis of the following equation (b) in the case of aspherical surfaces] with respect to the X-, Y- and Z-axes ($\alpha$, $\beta$ and $\gamma$, respectively). In this case, positive $\alpha$ and $\beta$ mean counterclockwise rotation relative to the positive directions of the corresponding axes, and positive $\gamma$ means clockwise rotation relative to the positive direction of the Z-axis.

Among optical surfaces constituting the optical system in each example, a specific surface (including a hypothetic plane) and a surface subsequent thereto are given a surface separation when these surfaces form a coaxial optical system. In addition, the refractive index and Abbel's number of each medium are given according to the conventional method.

The configuration of each free-form surface used in the present invention is defined by the above equation (a). The Z-axis of the defining equation is the axis of the free-form surface.

Aspherical surfaces used in the present invention are rotationally symmetric aspherical surfaces given by the following equation:

$$Z=(y^2/R)/[1+\{1-(1+K)y^2/R^2\}^{1/2}]+Ay^4+By^6+Cy^8+Dy^{10}+ \quad (b)$$

In the above equation, Z is an optical axis (axial principal ray) for which the direction of travel of light is defined as a positive direction, and y is taken in a direction perpendicular to the optical axis. R is a paraxial curvature radius, K is a conic constant, and A, B, C, D . . . are 4th-, 6th-, 8th- and 10th-order aspherical coefficients, respectively. The Z-axis of this defining equation is the axis of the rotationally symmetric aspherical surface.

In the constituent parameters (shown later), those terms concerning free-form surfaces and aspherical surfaces for which no data is shown are zero. The refractive index is expressed by the refractive index for the spectral d-line (wavelength: 587.56 nanometers). Lengths are given in millimeters.

Free-form surfaces may also be defined by Zernike polynomials. That is, the configuration of a free-form surface may be defined by the following equation (c). The Z-axis of the defining equation (c) is the axis of Zernike polynomial. A rotationally asymmetric surface is defined by polar coordinates of the height of the Z-axis with respect to the XY-plane. In the equation (c), A is the distance from the Z-axis in the XY-plane, and R is the azimuth angle about the Z-axis, which is expressed by the angle of rotation measured from the Z-axis.

$$x=R\times\cos(A)$$

$$y=R\times\sin(A)$$

$$Z=D_2+D_3R\cos(A)+D_4R\sin(A)$$

$$+D_5R^2\cos(2A)+D_6(R^2-1)+D_7R^2\sin(2A)$$

$$+D_8R^3\cos(3A)+D_9(3R^3-2R)\cos(A)$$

$$+D_{10}(3R^3-2R)\sin(A)+D_{11}R^3\sin(3A)$$

$$+D_{12}R^4\cos(4A)+D_{13}(4R^4-3R^2)\cos(2A)$$

$$+D_{14}(6R^4-6R^2+1)+D_{15}(4R^4-3R^2)\sin(2A)$$

$$+D_{16}R^4\sin(4A)$$

$$+D_{17}R^5\cos(5A)+D_{18}(5R^5-4R^3)\cos(3A)$$

$$+D_{19}(10R^5-12R^3+3R)\cos(A)$$

$$+D_{20}(10R^5-12R^3+3R)\sin(A)$$

$$+D_{21}(5R^5-4R^3)\sin(3A)+D_{22}R^5\sin(5A)$$

$$+D_{23}R^6\cos(6A)+D_{24}(6R^6-5R^4)\cos(4A)$$

$$+D_{25}(15R^6-20R^4+6R^2)\cos(2A)$$

$$+D_{26}(20R^6-30R^4+12R^2-1)$$

$$+D_{27}(15R^6-20R^4+6R^2)\sin(2A)$$

$$+D_{28}(6R^6-5R^4)\sin(4A)+D_{29}R^6\sin(6A) \quad (c)$$

In the above equation, to design an optical system symmetric with respect to the X-axis direction, $D_4$, $D_5$, $D_6$, $D_{10}$, $D_{11}$, $D_{12}$, $D_{13}$, $D_{14}$, $D_{20}$, $D_{21}$, $D_{22}$. . . should be used.

Other examples of surfaces usable in the present invention are expressed by the following defining equation (d):

$$Z=\Sigma\Sigma C_{nm}XY$$

Assuming that k=7 (polynomial of degree 7), for example, a free-form surface is expressed by an expanded form of the above equation as follows:

$$Z=C_2+C_3y+C_4|x|$$

$$+C_5y^2+C_6y|x|+C_7x^2$$

$$+C_8y^3+C_9y^2|x|+C_{10}yx^2+C_{11}|x^3|$$

$$+C_{12}y^4+C_{13}y^3|x|+C_{14}y^2x^2+C_{15}y|x^3|+C_{16}x^4$$

$$+C_{17}y^5+C_{18}y^4|x|+C_{19}y^3x^2+C_{20}y^2|x^3|$$

$$+C_{21}yx^4+C_{22}|x^5|$$

$$+C_{23}y^6+C_{24}y^5|x|+C_{25}y^4x^2+C_{26}Y^3|x^3|$$

$$+C_{27}y^2x^4+C_{28}y|x^5|+C_{29}x^6$$

$$+C_{30}y^7+C_{31}y^6|x|+C_{32}y^5x^2+C_{33}y^4|x^3|$$

$$+C_{34}y^3x^4+C_{35}y^2|x^5|+C_{36}yx^6+C_{37}|x^7| \quad (d)$$

Although in the surface configuration is expressed by a free-form surface using the above equation (a), it should be noted that the same advantageous effect can be obtained by using the above equation (c) or (d).

Figure 2:
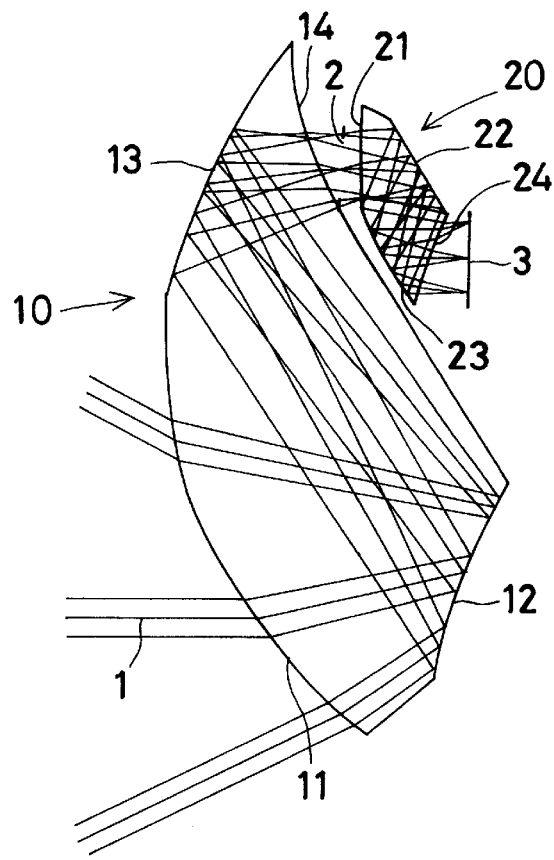
FIG. 2 is a sectional view of an image-forming optical system according to Example 2 of the present invention.
Figure 3:
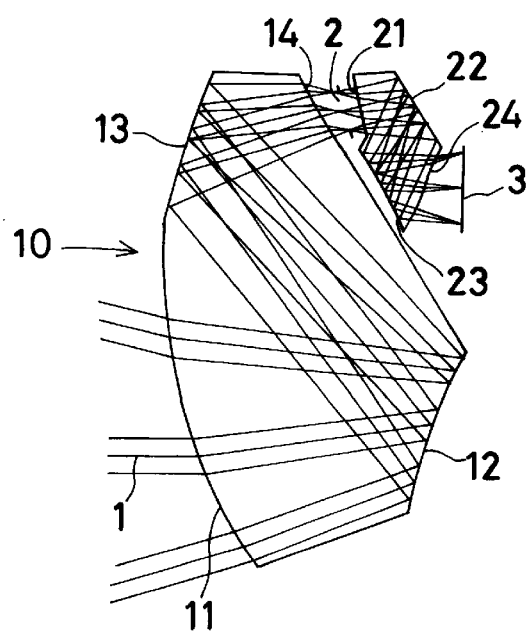
FIG. 3 is a sectional view of an image-forming optical system according to Example 3 of the present invention.

FIGS. 1 to 3 are sectional views of Examples 1 to 3, respectively, taken along the YZ-plane containing the axial principal ray. Constituent parameters of these examples will be shown later. In the constituent parameters, free-form surfaces are denoted by "FFS", aspherical surfaces by "ASS", and hypothetic planes by "HRP" (Hypothetic Reference Plane).

Examples 1 to 3 each have, in order in which light passes from the object side, a first prism 10, a stop 2, a second prism 20, and an image plane (image-formation lane) 3. The first prism 10 is formed from a first surface 11, a second surface 12, a third surface 13, and a fourth surface 14. The first surface 11 is a first transmitting surface. The second surface 12 is a first reflecting surface. The third surface 13 is a second reflecting surface. The fourth surface 14 is a second transmitting surface. Rays from the object enter through the first transmitting surface 11 and are reflected successively by the first reflecting surface 12 and the second reflecting surface 13 and then exit from the second transmitting surface 14. The second prism 20 is formed from a first surface 21, a second surface 22, a third surface 23, and a fourth surface 24. The first surface 21 is a first transmitting surface. The second surface 22 is a first reflecting surface. The third surface 23 is a second reflecting surface. The fourth surface 24 is second transmitting surface. Rays from the object enter through the first transmitting surface 21 and are reflected successively by the first reflecting surface 22 and the second reflecting surface 23 and then exit from the second transmitting surface 24.

In the constituent parameters (shown later), the displacements of each of the surface Nos. 2 to 6 are expressed by the amounts of displacement from the hypothetic plane 1 of surface No. 1. The vertex positions of the surface Nos. 7 and 8 are each expressed by only the surface separation along the axial principal ray from the hypothetic plane 2 of surface No. 6. The displacements of each of the surface Nos. 9 to 13 are expressed by the amounts of displacement from the hypothetic plane 3 of surface No. 8. The image plane is expressed by only the surface separation along the axial principal ray from the hypothetic plane 4 of surface No. 13.

In all Examples 1 to 3, the image height is 1.6×1.2 millimeters. The focal length Fx in the X-axis direction is determined by conversion from $$Ix = Fx \times \tan\theta x$$

where Ix is the image height in the X-axis direction, and θx is the field angle in the X-axis direction.

In Example 1, the horizontal half field angle is 26.3°, and the vertical half field angle is 20.3°. The entrance pupil diameter is 1.15 millimeters. Therefore, the F-number is 2.8, and the focal length Fx is 3.43 millimeters, which is equivalent to 35 millimeters in terms of the focal length of a silver halide camera.

In Example 2, the horizontal half field angle is 31.7°, and the vertical half field angle is 24.9°. The entrance pupil diameter is 1.15 millimeters. Therefore, the F-number is 2.25, and the focal length Fx is 2.68 millimeters, which is equivalent to 28 millimeters in terms of the focal length of a silver halide camera.

In Example 3, the horizontal half field angle is 19.1°, and the vertical half field angle is 14.6°. The entrance pupil diameter is 1.15 millimeters. Therefore, the F-number is 4.02, and the focal length Fx is 4.83 millimeters, which is equivalent to 50 millimeters in terms of the focal length of a silver halide camera.

The image-forming optical system according to the present invention can be applied to other sizes, as a matter of course. The present invention includes not only an image pickup optical system using the image-forming optical system according to the present invention but also an image pickup apparatus incorporating the image pickup optical system.

Constituent parameters in the foregoing Examples 1 to 3 are shown below. In the tables below: "FFS" denotes a free-form surface; "ASS" denotes an aspherical surface; and "HRP" denotes a hypothetic plane.

EXAMPLE 1

| Surface No. | Radius of curvature | Surface separation | Displacement and tilt | Refractive index | Abbe's No. |
|---|---|---|---|---|---|
| Object plane | ∞ | ∞ | | | |
| 1 | ∞(HRP1) | | | | |
| 2 | FFS① | | (1) | 1.4924 | 57.6 |
| 3 | FFS② | | (2) | 1.4924 | 57.6 |
| 4 | FFS③ | | (3) | 1.4924 | 57.6 |
| 5 | ASS① | | (4) | | |
| 6 | ∞(HRP2) | 0.70 | (5) | | |
| 7 | ∞(Stop) | 0.70 | | | |
| 8 | ∞(HRP3) | | | | |
| 9 | ASS② | | (6) | 1.4924 | 57.6 |
| 10 | FFS④ | | (7) | 1.4924 | 57.6 |
| 11 | FFS⑤ | | (8) | 1.4924 | 57.6 |
| 12 | FFS⑥ | | (9) | | |
| 13 | ∞(HRP4) | 1.19 | (10) | | |
| Image plane | ∞ | | | | |

ASS①
R   18.51
K   0.0000
A   $5.4470 \times 10^{-5}$

ASS②
R   −44.40
K   0.0000
A   $-2.4843 \times 10^{-4}$

FFS①
$C_4$ $2.0178 \times 10^{-2}$  $C_6$ $2.1872 \times 10^{-2}$  $C_8$ $-5.4200 \times 10^{-4}$
$C_{10}$ $-3.3725 \times 10^{-4}$  $C_{11}$ $1.2009 \times 10^{-5}$  $C_{13}$ $1.8600 \times 10^{-4}$ -continued

| Surface No. | Radius of curvature | Surface separation | Displacement and tilt | Refractive index | Abbe's No. |
|---|---|---|---|---|---|

$C_{15}$ $1.9492 \times 10^{-4}$

FFS②
$C_4$ $2.7942 \times 10^{-2}$  $C_6$ $2.3972 \times 10^{-2}$  $C_8$ $2.1507 \times 10^{-4}$
$C_{10}$ $-2.7784 \times 10^{-4}$  $C_{11}$ $8.0077 \times 10^{-5}$  $C_{13}$ $2.0906 \times 10^{-4}$
$C_{15}$ $2.6708 \times 10^{-4}$ FFS③
$C_4$ $2.9165 \times 10^{-2}$  $C_6$ $2.0568 \times 10^{-2}$  $C_8$ $7.7047 \times 10^{-4}$
$C_{10}$ $2.6207 \times 10^{-5}$  $C_{11}$ $2.7557 \times 10^{-6}$  $C_{13}$ $4.3868 \times 10^{-5}$
$C_{15}$ $1.6806 \times 10^{-6}$ FFS④
$C_4$ $-2.6133 \times 10^{-2}$  $C_6$ $-1.8692 \times 10^{-2}$  $C_8$ $4.1306 \times 10^{-3}$
$C_{10}$ $-9.8269 \times 10^{-4}$  $C_{11}$ $-1.3584 \times 10^{-4}$  $C_{13}$ $-7.4991 \times 10^{-4}$
$C_{15}$ $-6.4843 \times 10^{-5}$ FFS⑤
$C_4$ $8.5536 \times 10^{-3}$  $C_6$ $2.0145 \times 10^{-3}$  $C_8$ $3.9785 \times 10^{-3}$
$C_{10}$ $-5.3766 \times 10^{-3}$  $C_{11}$ $-2.0824 \times 10^{-4}$  $C_{13}$ $-2.1686 \times 10^{-3}$
$C_{15}$ $2.6820 \times 10^{-7}$ FFS⑥
$C_4$ $2.0460 \times 10^{-2}$  $C_6$ $2.1655 \times 10^{-2}$  $C_8$ $3.2349 \times 10^{-3}$
$C_{10}$ $9.1861 \times 10^{-3}$  $C_{11}$ $3.8953 \times 10^{-3}$  $C_{13}$ $-3.3305 \times 10^{-3}$
$C_{15}$ $-1.1245 \times 10^{-3}$ Displacement and tilt(1)

| X | 0.00 | Y | 0.00 | Z | 0.00 |
|---|---|---|---|---|---|
| α | 18.82 | β | 0.00 | γ | 0.00 |

Displacement and tilt(2)

| X | 0.00 | Y | 0.88 | Z | 7.94 |
|---|---|---|---|---|---|
| α | −25.83 | β | 0.00 | γ | 0.00 |

Displacement and tilt(3)

| X | 0.00 | Y | 13.53 | Z | 0.03 |
|---|---|---|---|---|---|
| α | −24.02 | β | 0.00 | γ | 0.00 |

Displacement and tilt(4)

| X | 0.00 | Y | 14.21 | Z | 3.87 |
|---|---|---|---|---|---|
| α | 28.81 | β | 0.00 | γ | 0.00 |

Displacement and tilt(5)

| X | 0.00 | Y | 14.21 | Z | 3.87 |
|---|---|---|---|---|---|
| α | 0.00 | β | 0.00 | γ | 0.00 |

Displacement and tilt(6)

| X | 0.00 | Y | 0.00 | Z | 0.00 |
|---|---|---|---|---|---|
| α | 18.04 | β | 0.00 | γ | 0.00 |

Displacement and tilt(7)

| X | 0.00 | Y | 0.21 | Z | 1.98 |
|---|---|---|---|---|---|
| α | 38.05 | β | 0.00 | γ | 0.00 |

Displacement and tilt(8)

| X | 0.00 | Y | −2.42 | Z | 1.02 |
|---|---|---|---|---|---|
| α | 33.16 | β | 0.00 | γ | 0.00 |

Displacement and tilt(9)

| X | 0.00 | Y | −2.52 | Z | 2.52 |
|---|---|---|---|---|---|
| α | −11.20 | β | 0.00 | γ | 0.00 |

Displacement and tilt(10)

| X | 0.00 | Y | −2.52 | Z | 2.52 |
|---|---|---|---|---|---|
| α | 0.00 | β | 0.00 | γ | 0.00 |

EXAMPLE 2

| Surface No. | Radius of curvature | Surface separation | Displacement and tilt | Refractive index | Abbe's No. |
|---|---|---|---|---|---|
| Object plane | ∞ | ∞ | | | |
| 1 | ∞(HRP1) | | | | |
| 2 | FFS① | | (1) | 1.4924 | 57.6 |
| 3 | FFS② | | (2) | 1.4924 | 57.6 |

-continued

| Surface No. | Radius of curvature | Surface separation | Displacement and tilt | Refractive index | Abbe's No. |
|---|---|---|---|---|---|
| 4 | FFS③ | | (3) | 1.4924 | 57.6 |
| 5 | ASS① | | (4) | | |
| 6 | ∞(HRP2) | 0.70 | (5) | | |
| 7 | ∞(Stop) | 0.70 | | | |
| 8 | ∞(HRP3) | | | | |
| 9 | ASS② | | (6) | 1.4924 | 57.6 |
| 10 | FFS④ | | (7) | 1.4924 | 57.6 |
| 11 | FFS⑤ | | (8) | 1.4924 | 57.6 |
| 12 | FFS⑥ | | (9) | | |
| 13 | ∞(HRP4) | 1.32 | (10) | | |
| Image plane | ∞ | | | | |

ASS①
R  13.72
K  0.0000
A  $1.5143 \times 10^{-4}$

ASS②
R  −49.30
K  0.0000
A  $-6.8906 \times 10^{-4}$

FFS①
$C_4$  $2.0167 \times 10^{-2}$   $C_6$  $2.6267 \times 10^{-2}$   $C_8$  $-9.3469 \times 10^{-5}$
$C_{10}$  $-3.3465 \times 10^{-4}$   $C_{11}$  $5.6556 \times 10^{-5}$   $C_{13}$  $1.5175 \times 10^{-4}$
$C_{15}$  $1.1802 \times 10^{-4}$ FFS②
$C_4$  $4.0845 \times 10^{-2}$   $C_6$  $2.9567 \times 10^{-2}$   $C_8$  $1.3310 \times 10^{-3}$
$C_{10}$  $8.7243 \times 10^{-4}$   $C_{11}$  $1.3896 \times 10^{-4}$   $C_{13}$  $2.3589 \times 10^{-4}$
$C_{15}$  $2.2200 \times 10^{-4}$ FFS③
$C_4$  $3.1470 \times 10^{-2}$   $C_6$  $2.0606 \times 10^{-2}$   $C_{11}$  $7.3799 \times 10^{-4}$
$C_{10}$  $2.2655 \times 10^{-4}$   $C_{11}$  $2.6257 \times 10^{-5}$   $C_{13}$  $4.7978 \times 10^{-5}$
$C_{15}$  $1.3089 \times 10^{-5}$ FFS④
$C_4$  $-1.7148 \times 10^{-2}$   $C_6$  $-1.8293 \times 10^{-2}$   $C_8$  $3.6561 \times 10^{-3}$
$C_{10}$  $1.0605 \times 10^{-3}$   $C_{11}$  $-2.0903 \times 10^{-4}$   $C_{13}$  $-6.3119 \times 10^{-4}$
$C_{15}$  $-1.7490 \times 10^{-4}$ FFS⑤
$C_4$  $1.8383 \times 10^{-2}$   $C_6$  $9.2622 \times 10^{-3}$   $C_8$  $4.4759 \times 10^{-3}$
$C_{10}$  $1.0850 \times 10^{-4}$   $C_{11}$  $-2.1917 \times 10^{-4}$   $C_{13}$  $-2.0945 \times 10^{-3}$
$C_{15}$  $-4.9421 \times 10^{-4}$ FFS⑥
$C_4$  $-1.8562 \times 10^{-2}$   $C_6$  $4.7704 \times 10^{-2}$   $C_8$  $2.1938 \times 10^{-2}$
$C_{10}$  $3.3161 \times 10^{-2}$   $C_{11}$  $6.7440 \times 10^{-3}$   $C_{13}$  $6.4516 \times 10^{-3}$
$C_{15}$  $4.4809 \times 10^{-3}$ Displacement and tilt(1)
| | | | | | | |
|---|---|---|---|---|---|---|
| X | 0.00 | Y | 0.00 | Z | 0.00 | |
| α | 36.03 | β | 0.00 | γ | 0.00 | |

Displacement and tilt(2)
| X | 0.00 | Y | 1.61 | Z | 7.07 |
|---|---|---|---|---|---|
| α | −21.08 | β | 0.00 | γ | 0.00 |

Displacement and tilt(3)
| X | 0.00 | Y | 14.40 | Z | −1.90 |
|---|---|---|---|---|---|
| α | −23.38 | β | 0.00 | γ | 0.00 |

Displacement and tilt(4)
| X | 0.00 | Y | 14.96 | Z | 2.00 |
|---|---|---|---|---|---|
| α | 24.13 | β | 0.00 | γ | 0.00 |

Displacement and tilt(5)
| X | 0.00 | Y | 14.96 | Z | 2.00 |
|---|---|---|---|---|---|
| α | 0.00 | β | 0.00 | γ | 0.00 |

Displacement and tilt(6)
| X | 0.00 | Y | 0.00 | Z | 0.00 |
|---|---|---|---|---|---|
| α | −0.56 | β | 0.00 | γ | 0.00 |

Displacement and tilt(7)
| X | 0.00 | Y | −0.01 | Z | 2.02 |
|---|---|---|---|---|---|
| α | 33.22 | β | 0.00 | γ | 0.00 |

Displacement and tilt(8)
| X | 0.00 | Y | −2.79 | Z | 0.82 |
|---|---|---|---|---|---|
| α | 30.60 | β | 0.00 | γ | 0.00 |

Displacement and tilt(9)
| X | 0.00 | Y | −2.93 | Z | 2.32 |
|---|---|---|---|---|---|
| α | −16.16 | β | 0.00 | γ | 0.00 |

Displacement and tilt(10)
| X | 0.00 | Y | −2.93 | Z | 2.32 |
|---|---|---|---|---|---|
| α | 0.00 | β | 0.00 | γ | 0.00 |

EXAMPLE 3

| Surface No. | Radius of curvature | Surface separation | Displacement and tilt | Refractive index | Abbe's No. |
|---|---|---|---|---|---|
| Object plane | ∞ | ∞ | | | |
| 1 | ∞(HRP1) | | | | |
| 2 | FFS① | | (1) | 1.4924 | 57.6 |
| 3 | FFS② | | (2) | 1.4924 | 57.6 |
| 4 | FFS③ | | (3) | 1.4924 | 57.6 |
| 5 | ASS① | | (4) | | |
| 6 | ∞(HRP2) | 0.70 | (5) | | |
| 7 | ∞(Stop) | 0.70 | | | |
| 8 | ∞(HRP3) | | | | |
| 9 | ASS② | | (6) | 1.4924 | 57.6 |
| 10 | FFS④ | | (7) | 1.4924 | 57.6 |
| 11 | FFS⑤ | | (8) | 1.4924 | 57.6 |
| 12 | FFS⑥ | | (9) | | |
| 13 | ∞(HRP4) | 1.29 | (10) | | |
| Image plane | ∞ | | | | |

ASS①
R  10.06
K  0.0000
A  $2.0493 \times 10^{-4}$

ASS②
R  −41.44
K  0.0000
A  $-8.5951 \times 10^{-4}$

FFS①
$C_4$  $3.02337 \times 10^{-2}$   $C_6$  $2.7941 \times 10^{-2}$   $C_8$  $-5.1263 \times 10^{-4}$
$C_{10}$  $-3.6511 \times 10^{-4}$   $C_{11}$  $1.9208 \times 10^{-5}$   $C_{13}$  $7.9897 \times 10^{-5}$
$C_{15}$  $5.8517 \times 10^{-5}$ FFS②
$C_4$  $2.2114 \times 10^{-2}$   $C_6$  $2.1533 \times 10^{-2}$   $C_8$  $-2.0384 \times 10^{-5}$
$C_{10}$  $-5.4470 \times 10^{-5}$   $C_{11}$  $3.4371 \times 10^{-5}$   $C_{13}$  $1.2104 \times 10^{-4}$
$C_{15}$  $9.3158 \times 10^{-5}$ FFS③
$C_4$  $2.6489 \times 10^{-2}$   $C_6$  $2.0826 \times 10^{-2}$   $C_8$  $4.0654 \times 10^{-4}$
$C_{10}$  $1.5823 \times 10^{-4}$   $C_{11}$  $1.4454 \times 10^{-5}$   $C_{13}$  $4.3841 \times 10^{-5}$
$C_{15}$  $1.5172 \times 10^{-5}$ FFS④
$C_4$  $-3.3482 \times 10^{-2}$   $C_6$  $-2.8600 \times 10^{-2}$   $C_8$  $1.2856 \times 10^{-3}$
$C_{10}$  $4.5852 \times 10^{-4}$   $C_{11}$  $-1.9084 \times 10^{-4}$   $C_{13}$  $-2.6030 \times 10^{-4}$
$C_{15}$  $-1.2578 \times 10^{-4}$ FFS⑤
$C_4$  $-8.9153 \times 10^{-3}$   $C_6$  $-1.6234 \times 10^{-2}$   $C_8$  $2.0114 \times 10^{-3}$
$C_{10}$  $-3.7750 \times 10^{-4}$   $C_{11}$  $-2.8507 \times 10^{-4}$   $C_{13}$  $-9.8928 \times 10^{-5}$
$C_{15}$  $-2.0361 \times 10^{-4}$ FFS⑥
$C_4$  $-7.6084 \times 10^{-2}$   $C_6$  $-2.9487 \times 10^{-2}$   $C_8$  $8.9433 \times 10^{-3}$
$C_{10}$  $1.9472 \times 10^{-2}$   $C_{11}$  $-6.0327 \times 10^{-4}$   $C_{13}$  $7.7508 \times 10^{-4}$
$C_{15}$  $1.2122 \times 10^{-4}$ Displacement and tilt(1)
| X | 0.00 | Y | 0.00 | Z | 0.00 |
|---|---|---|---|---|---|
| α | 20.87 | β | 0.00 | γ | 0.00 |

Displacement and tilt(2)
| X | 0.00 | Y | 0.98 | Z | 7.92 |
|---|---|---|---|---|---|
| α | −20.85 | β | 0.00 | γ | 0.00 |

-continued

| Surface No. | Radius of curvature | Surface separation | Displacement and tilt | | Refractive index | Abbe's No. |
|---|---|---|---|---|---|---|
| | | | Displacement and tilt(3) | | | |
| X | 0.00 | | Y | 10.52 | Z | −0.44 |
| α | −18.94 | | β | 0.00 | γ | 0.00 |
| | | | Displacement and tilt(4) | | | |
| X | 0.00 | | Y | 11.36 | Z | 3.95 |
| α | 31.19 | | β | 0.00 | γ | 0.00 |
| | | | Displacement and tilt(5) | | | |
| X | 0.00 | | Y | 11.36 | Z | 3.95 |
| α | 0.00 | | β | 0.00 | γ | 0.00 |
| | | | Displacement and tilt(6) | | | |
| X | 0.00 | | Y | 0.00 | Z | 0.00 |
| α | 11.35 | | β | 0.00 | γ | 0.00 |
| | | | Displacement and tilt(7) | | | |
| X | 0.00 | | Y | 0.13 | Z | 1.96 |
| α | 34.06 | | β | 0.00 | γ | 0.00 |
| | | | Displacement and tilt(8) | | | |
| X | 0.00 | | Y | −2.42 | Z | 0.74 |
| α | 28.97 | | β | 0.00 | γ | 0.00 |
| | | | Displacement and tilt(9) | | | |
| X | 0.00 | | Y | −2.59 | Z | 2.26 |
| α | −19.06 | | β | 0.00 | γ | 0.00 |
| | | | Displacement and tilt(10) | | | |

Figure 4:
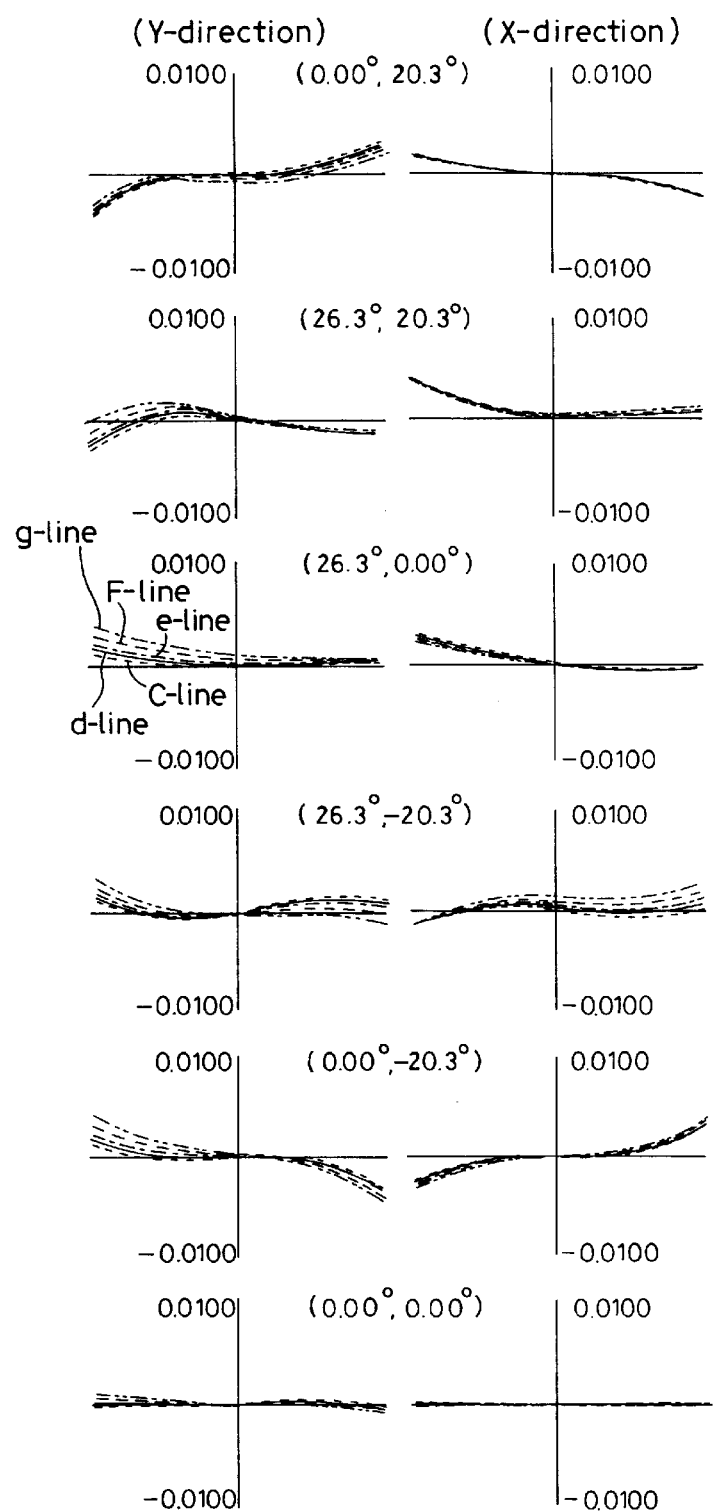
FIG. 4 is an aberrational diagram showing lateral aberrations in the image-forming optical system according to Example 1.
Figure 5:
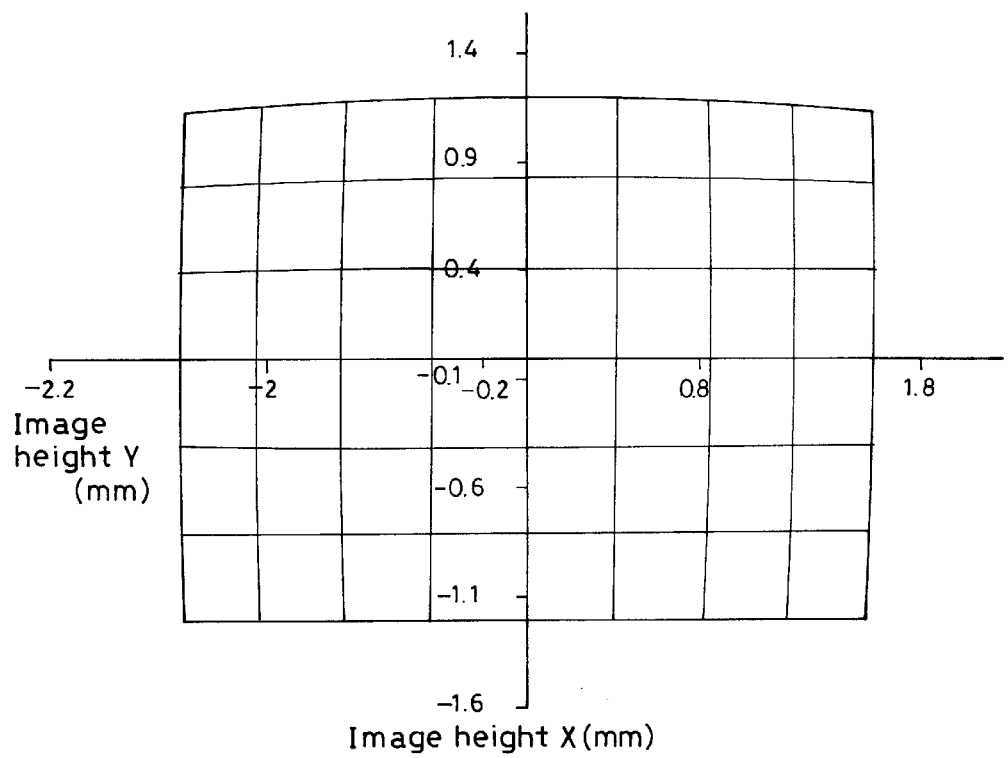
FIG. 5 is a diagram showing distortion in Example 1.

FIG. 4 is an aberrational diagram showing lateral aberrations in the above-described Example 1. In the diagram showing lateral aberrations, the numerals in the parentheses denote [horizontal (X-direction) field angle, vertical (Y-direction) field angle], and lateral aberrations at the field angles are shown. FIG. 5 shows distortion in the above-described Example 1.

The values concerning the conditions (2) to (9) in the above-described Examples 1 to 3 are as follows:

| | Example 1 | Example 2 | Example 3 |
|---|---|---|---|
| (2) | −0.573 | −0.652 | −0.638 |
| (3) | −0.477 | −0.456 | −0.609 |
| (4) | 0.598 | 0.503 | 0.764 |
| (5) | 0.409 | 0.318 | 0.589 |
| (6) | 6.48 | 8.71 | 3.92 |
| (7) | 0.536 | 0.274 | 0.965 |
| (8) | 0.372 | 0.282 | 0.809 |
| (9) | 33.98° | 31.6° | 29.83° |

Incidentally, the above-described image-forming optical system according to the present invention can be used in photographic apparatus, particularly in cameras, in which an object image formed by the image-forming optical system is received with an image pickup device, such as a CCD or a silver halide film, to take a photograph of the object. It is also possible to use the image-forming optical system as an objective optical system of an observation apparatus in which an object image is viewed through an ocular lens, particularly a finder unit of a camera. The image-forming optical system according to the present invention is also usable as an image pickup optical system for optical apparatus using a small-sized image pickup device, e.g. endoscopes. Embodiments in which the present invention is applied to such apparatuses will be described below.

Figure 6:
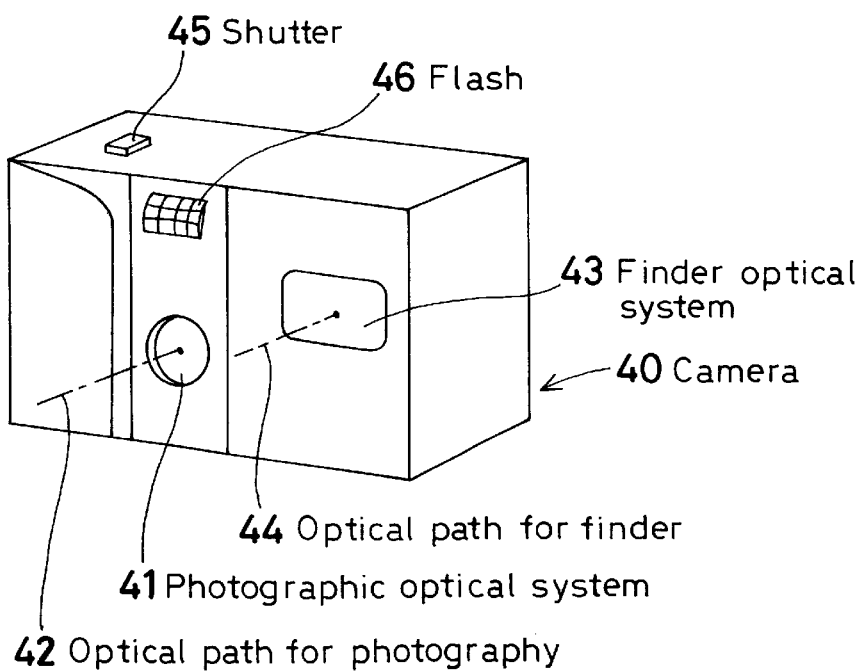
FIG. 6 is a perspective view showing the external appearance of an electronic camera to which an image-forming optical system according to the present invention is applied, as viewed from the front side thereof.
Figure 7:
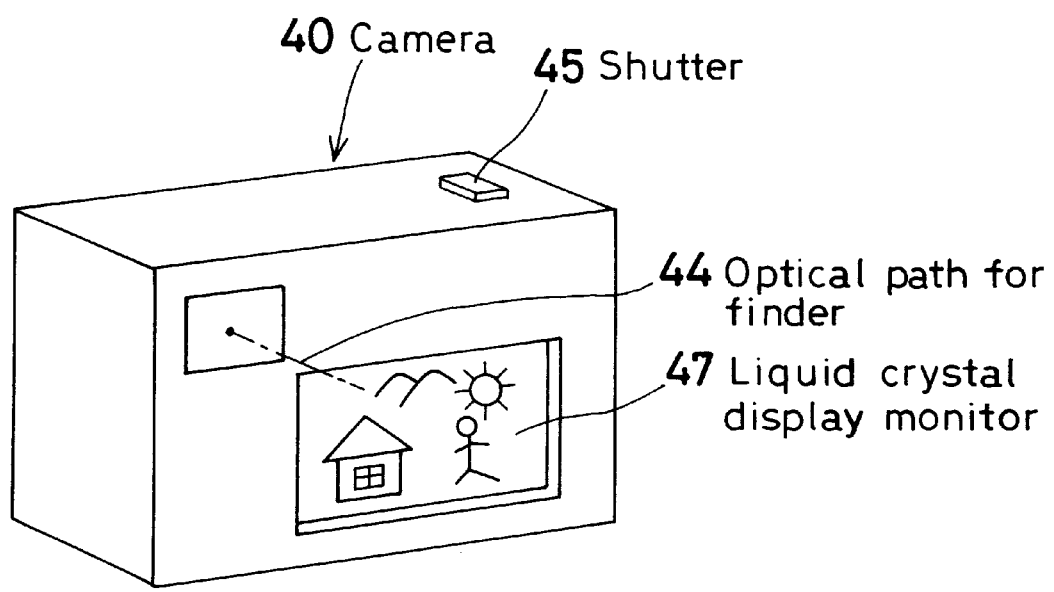
FIG. 7 is a perspective view of the electronic camera shown in FIG. 6, as viewed from the rear side thereof.
Figure 8:
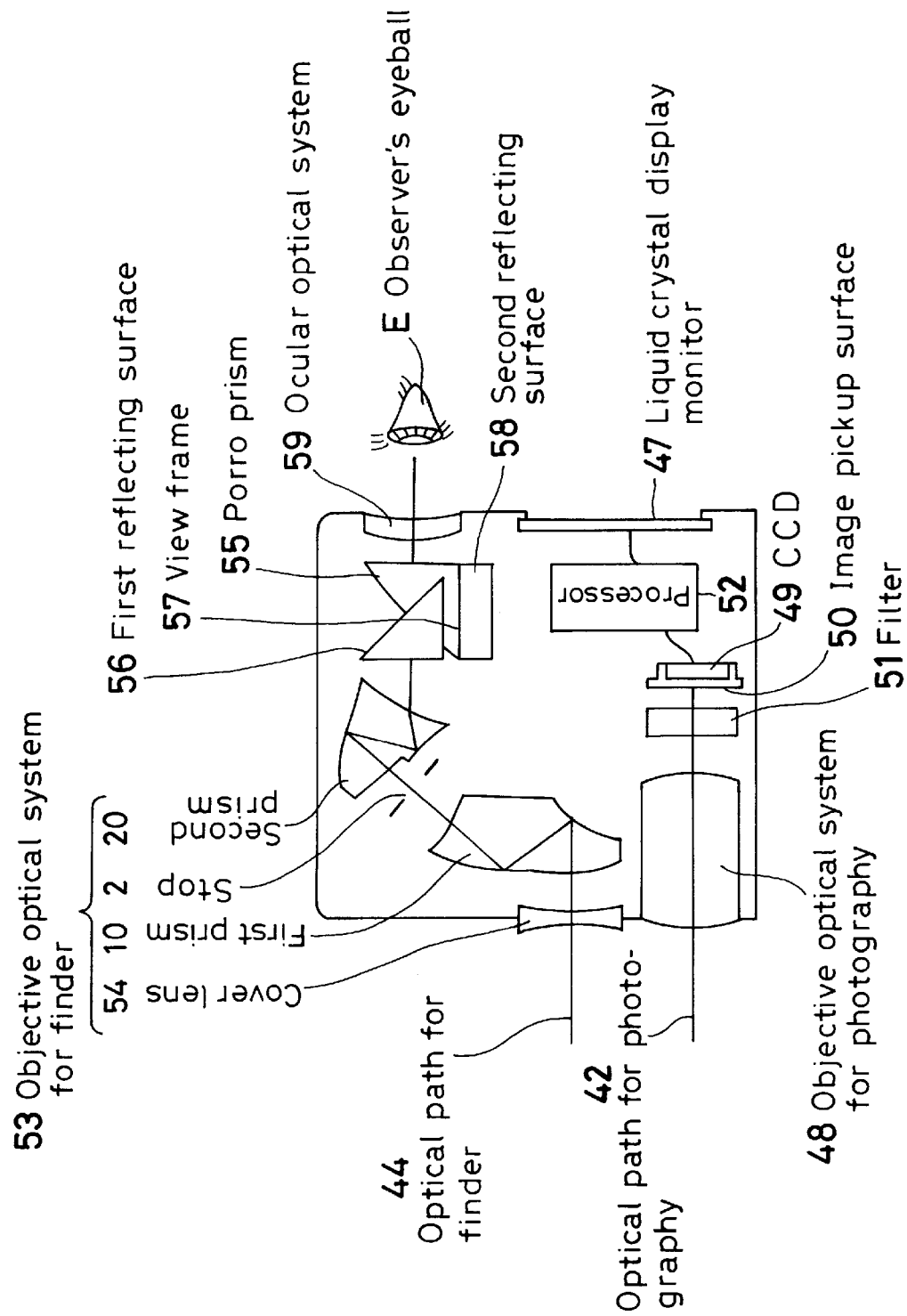
FIG. 8 is a sectional view showing the arrangement of the electronic camera in FIG. 6.

FIGS. 6 to 8 are conceptual views showing an arrangement in which the image-forming optical system according to the present invention is incorporated into an objective optical system of a finder unit of an electronic camera. FIG. 6 is a perspective view showing the external appearance of an electronic camera 40 as viewed from the front side thereof. FIG. 7 is a perspective view of the electronic camera 40 as viewed from the rear side thereof. FIG. 8 is a sectional view showing the arrangement of the electronic camera 40. In the illustrated example, the electronic camera 40 includes a photographic optical system 41 having an optical path 42 for photography, a finder optical system 43 having an optical path 44 for the finder, a shutter 45, a flash 46, a liquid crystal display monitor 47, etc. When the shutter 45, which is placed on the top of the camera 40, is depressed, photography is performed through an objective optical system 48 for photography. An object image produced by the objective optical system 48 for photography is formed on an image pickup surface 50 of a CCD 49 through a filter 51, e.g. a low-pass filter or an infrared cutoff filter. The object image received by the CCD 49 is processed in a processor 52 and displayed as an electronic image on the liquid crystal display monitor 47, which is provided on the rear of the camera 40. The processor 52 is provided with a memory or the like to enable the photographed electronic image to be recorded. It should be noted that the memory may be provided separately from the processor 52. The arrangement may also be such that the photographed electronic image is electronically recorded or written on a floppy disk or the like. The camera may be arranged in the form of a silver halide camera in which a silver halide film is disposed in place of the CCD 49.

Furthermore, an image-forming optical system according to the present invention is placed in the optical path 44 for the finder as an objective optical system 53 for the finder. In this case, a cover lens 54 having a negative power is provided as a cover member to form a part of the objective optical system 53, thereby enlarging the field angle. It should be noted that the cover lens 54 and the prism 10 of the image-forming optical system, which is closer to the object side than the stop 2, constitute a front unit of the objective optical system 53 for the finder. The prism 20 of the image-forming optical system, which is closer to the image side than the stop 2, constitutes a rear unit of the objective optical system 53 for the finder. An object image produced by the objective optical system 53 for the finder is formed on a view frame 57 of a Porro prism 55, which is an image-erecting member. It should be noted that the view frame 57 is placed between a first reflecting surface 56 and second reflecting surface 58 of the Porro prism 55. An ocular optical system 59 is placed behind the Porro prism 55 to lead an erect image to an observer's eyeball E.

In the camera 40, which is arranged as stated above, the objective optical system 53 for the finder can be constructed with a minimal number of optical members. Accordingly, a high-performance and low-cost camera can be realized. In addition, because the optical path of the objective optical system 53 can be folded, the degree of freedom with which the constituent elements can be arranged in the camera increases. This is favorable for design.

Although no mention is made of the arrangement of the objective optical system 48 for photography in the electronic camera 40 shown in FIG. 8, it should be noted that the objective optical system 48 for photography may be formed by using not only a refracting coaxial optical system but also any of the image-forming optical systems, which comprises two prisms 10 and 20, according to the present invention.

Figure 9:
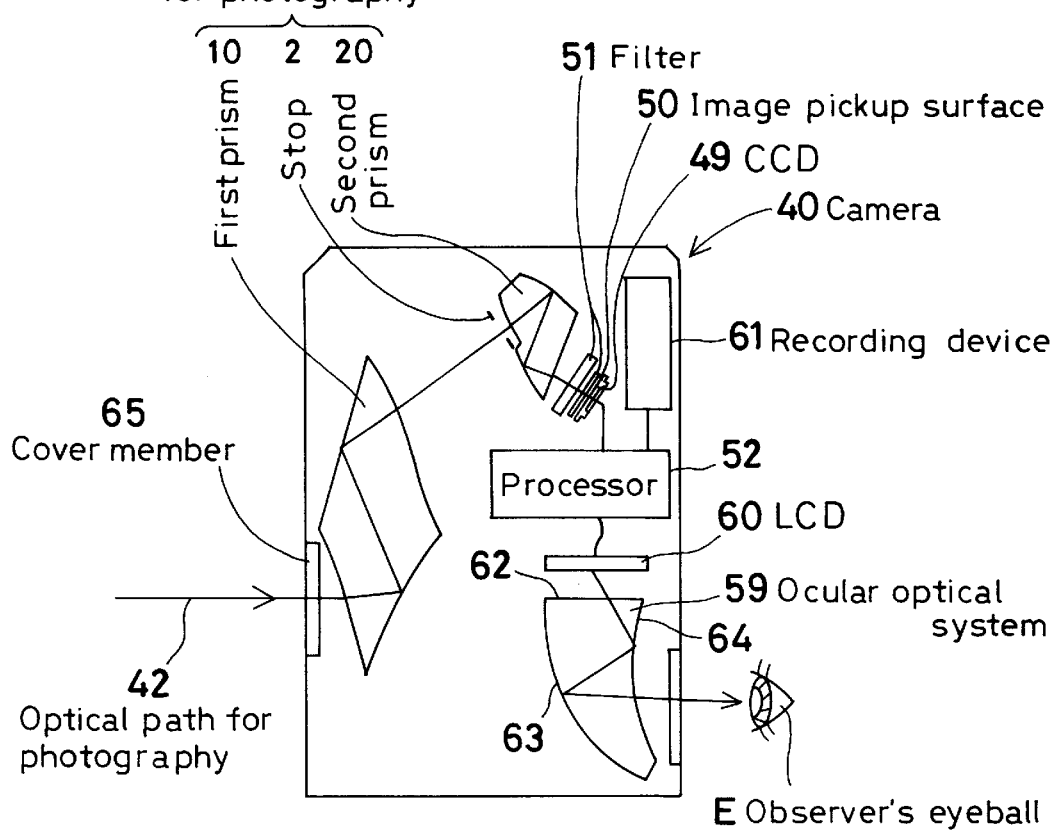
FIG. 9 is a conceptual view of another electronic camera to which an image-forming optical system according to the present invention is applied.

FIG. 9 is a conceptual view showing an arrangement in which an image-forming optical system according to the present invention is incorporated into an objective optical system 48 in a photography part of an electronic camera 40. In this example, an image-forming optical system according to the present invention is used in the objective optical system 48 for photography, which is placed in an optical path 42 for photography. An object image produced by the objective optical system 48 for photography is formed on an image pickup surface 50 of a CCD 49 through a filter 51, e.g. a low-pass filter or an infrared cutoff filter. The object image received by the CCD 49 is processed in a processor 52 and displayed in the form of an electronic image on a liquid crystal display device (LCD) 60. The processor 52 also controls a recording device 61 for recording the object image detected by the CCD 49 in the form of electronic information. The image displayed on the LCD 60 is led to an observer's eyeball E through an ocular optical system 59. The ocular optical system 59 is formed from a decentered prism having a configuration similar to that used in the image-forming optical system according to the present invention. In this example, the ocular optical system 59 has three surfaces, i.e. an entrance surface 62, a reflecting surface 63, and a surface 64 serving as both reflecting and refracting surfaces. At least one of the two reflecting surfaces 63 and 64, preferably each of them, is formed from a plane-symmetry free-form surface with only one plane of symmetry that gives a power to a light beam and corrects aberrations due to decentration. The only one plane of symmetry is formed in approximately the same plane as the only one plane of symmetry of the plane-symmetry free-form surfaces in the prisms 10 and 20 provided in the objective optical system 48 for photography. The objective optical system 48 for photography may include another lens (positive or negative lens) as a constituent element at a position on the object side of the two prisms 10 and 20, a position therebetween, or a position on the image side of the two prisms 10 and 20.

In the camera 40 arranged as stated above, the objective optical system 48 for photography can be constructed with a minimal number of optical members. Accordingly, a high-performance and low-cost camera can be realized. In addition, because all the constituent elements of the optical system can be arranged in the same plane, it is possible to reduce the thickness in a direction perpendicular to the plane in which the constituent elements are arranged.

Although in this example a plane-parallel plate is placed as a cover member 65 of the objective optical system 48 for photography, it is also possible to use a lens having a power as the cover member 65 as in the case of the above-described example.

The surface closest to the object side in the image-forming optical system according to the present invention may be used as a cover member instead of providing a cover member separately. In this example, the entrance surface of the prism 10 is the closest to the object side in the image-forming optical system. In such a case, however, because the entrance surface is decentered with respect to the optical axis, if this surface is placed on the front side of the camera, it gives the illusion that the photographic center of the camera 40 is deviated from the subject when the entrance surface is seen from the subject side (the subject normally feels that photographing is being performed in a direction perpendicular to the entrance surface, as in the case of ordinary cameras). Thus, the entrance surface would give a sense of incongruity. Therefore, in a case where the surface of the image-forming optical system that is closest to the object side is a decentered surface as in this example, it is desirable to provide the cover member 65 (or cover lens 54) from the viewpoint of preventing the subject from feeling incongruous when seeing the entrance surface, and allowing the subject to be photographed with the same feeling as in the case of the existing cameras.

Figure 10A:
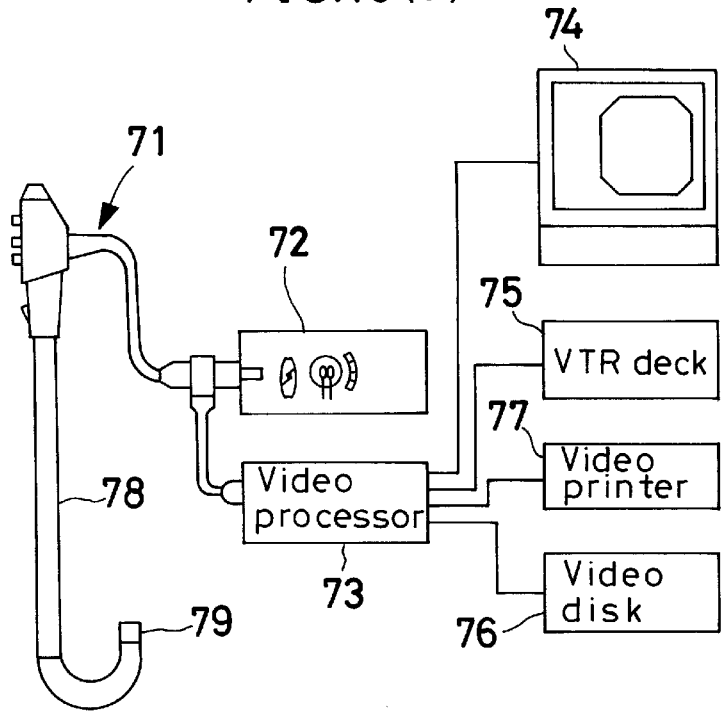
FIG. 10 is a conceptual view of a video endoscope system to which an image-forming optical system according to the present invention is applied.
Figure 10B:
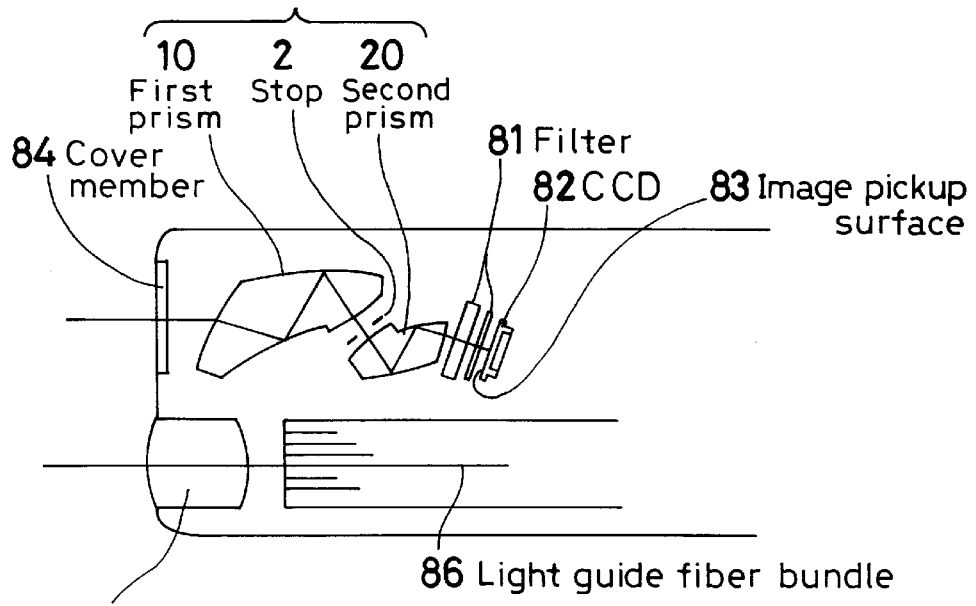
Figure 11:
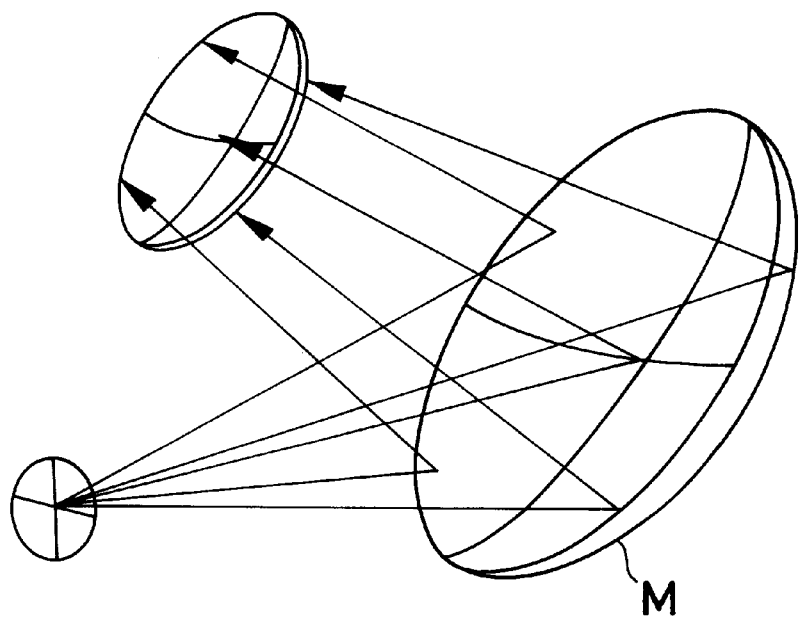
FIG. 11 is a conceptual view for describing curvature of field produced by a decentered reflecting surface.
Figure 12:
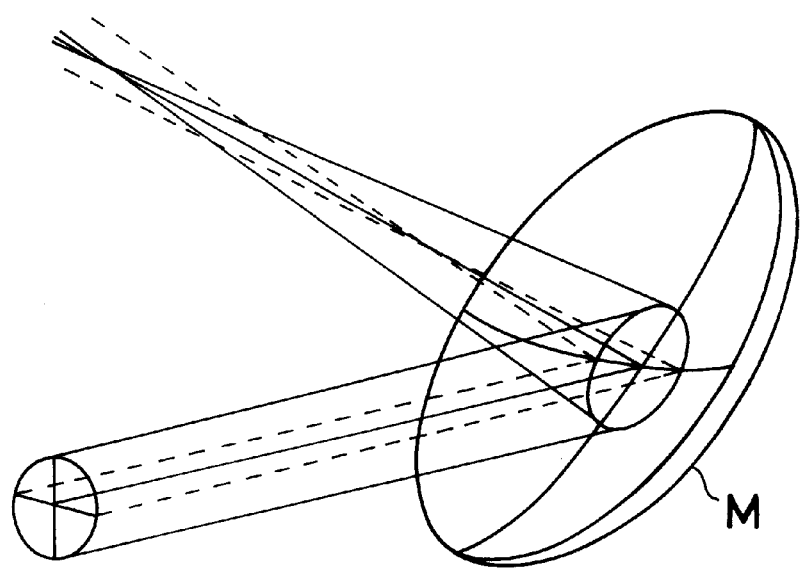
FIG. 12 is a conceptual view for describing astigmatism produced by a decentered reflecting surface.
Figure 13:
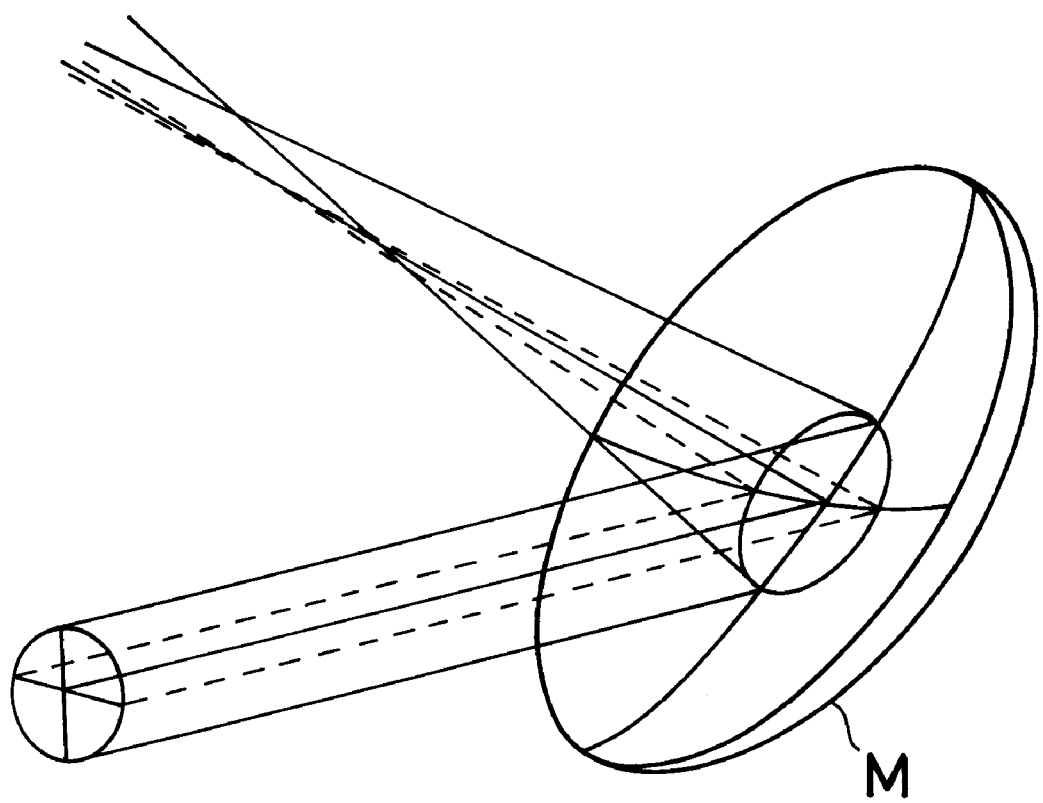
FIG. 13 is a conceptual view for describing coma produced by a decentered reflecting surface.

FIG. 10 is a conceptual view showing an arrangement in which an image-forming optical system according to the present invention is incorporated into an objective optical system 80 in an observation system of a video endoscope system. As shown in part (a) of FIG. 10, the video endoscope system includes a video endoscope 71, a light source unit 72 for supplying illuminating light, a video processor 73 for executing processing of signals associated with the video endoscope 71, a monitor 74 for displaying video signals outputted from the video processor 73, a VTR deck 75 and a video disk 76, which are connected to the video processor 73 to record video signals and so forth, and a video printer 77 for printing out video signals in the form of images. The video endoscope 71 has an insert part 78 with a distal end portion 79. The distal end portion 79 is arranged as shown in part (b) of FIG. 10. A light beam from the light source unit 72 passes through a light guide fiber bundle 86 and illuminates a part to be observed through an objective optical system 85 for illumination. Light from the part to be observed enters an objective optical system 80 for observation through a cover member 84. Thus, an object image is formed by the objective optical system 80. The object image is formed on an image pickup surface 83 of a CCD 82 through a filter 81, e.g. a low-pass filter or an infrared cutoff filter. Furthermore, the object image is converted into a video signal by the CCD 82. The video signal is displayed directly on the monitor 74 by the video processor 73, which is shown in part (a) of FIG. 10. In addition, the video signal is recorded in the VTR deck 75 and on the video disk 76 and also printed out in the form of an image from the video printer 77.

The endoscope arranged as stated above can be constructed with a minimal number of optical members. Accordingly, a high-performance and low-cost endoscope can be realized. Moreover, because the two prism 10 and 20, which constitute the objective optical system 80 of the observation system, are arranged in series in the direction of the longitudinal axis of the endoscope, the above-described advantageous effects can be obtained without hindering the achievement of a reduction in the diameter of the endoscope.

Figure 14:
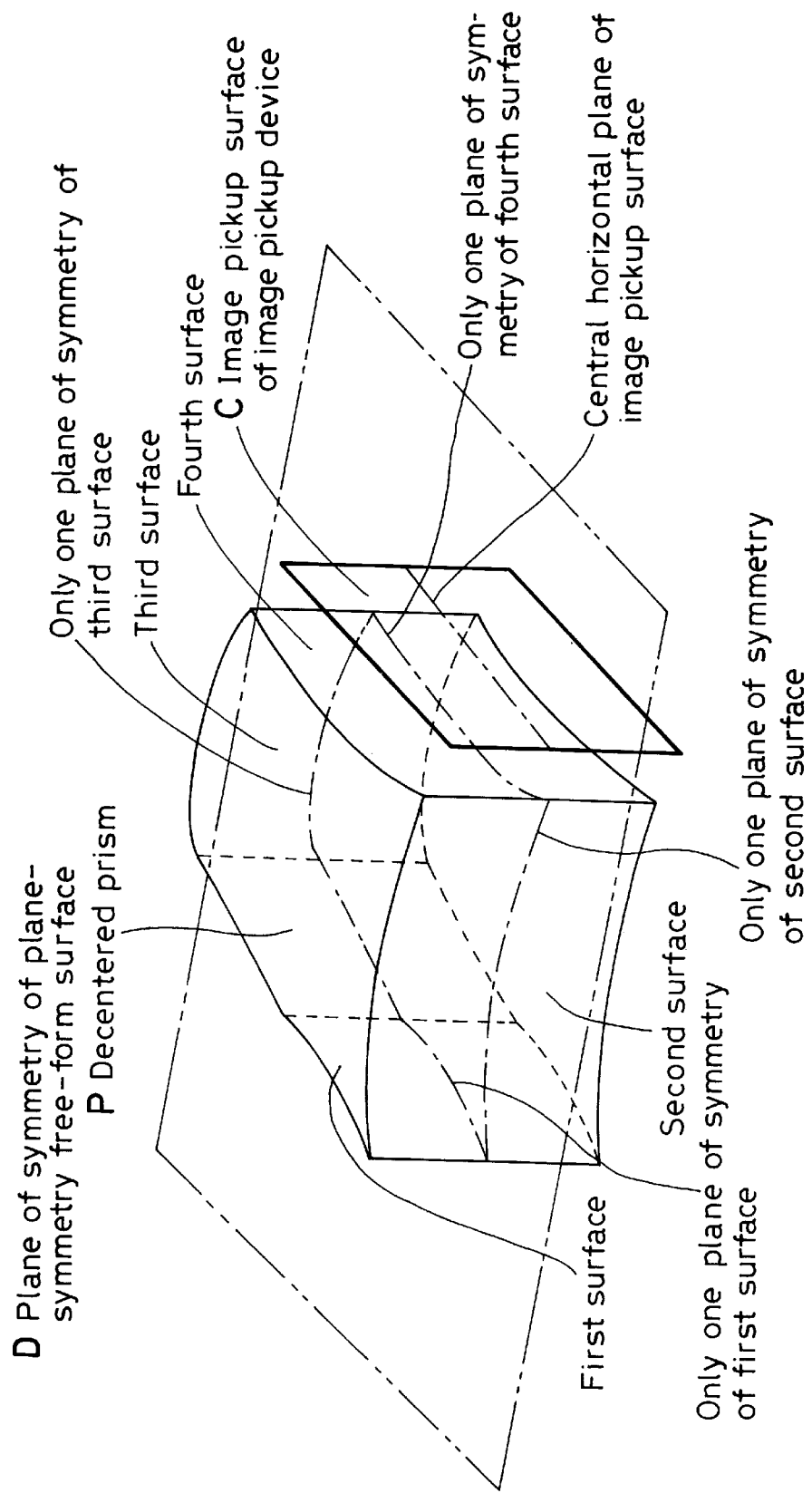
FIG. 14 is a diagram showing a desirable arrangement for an image-forming optical system according to the present invention when it is placed in front of an image pickup device.
Figure 15:
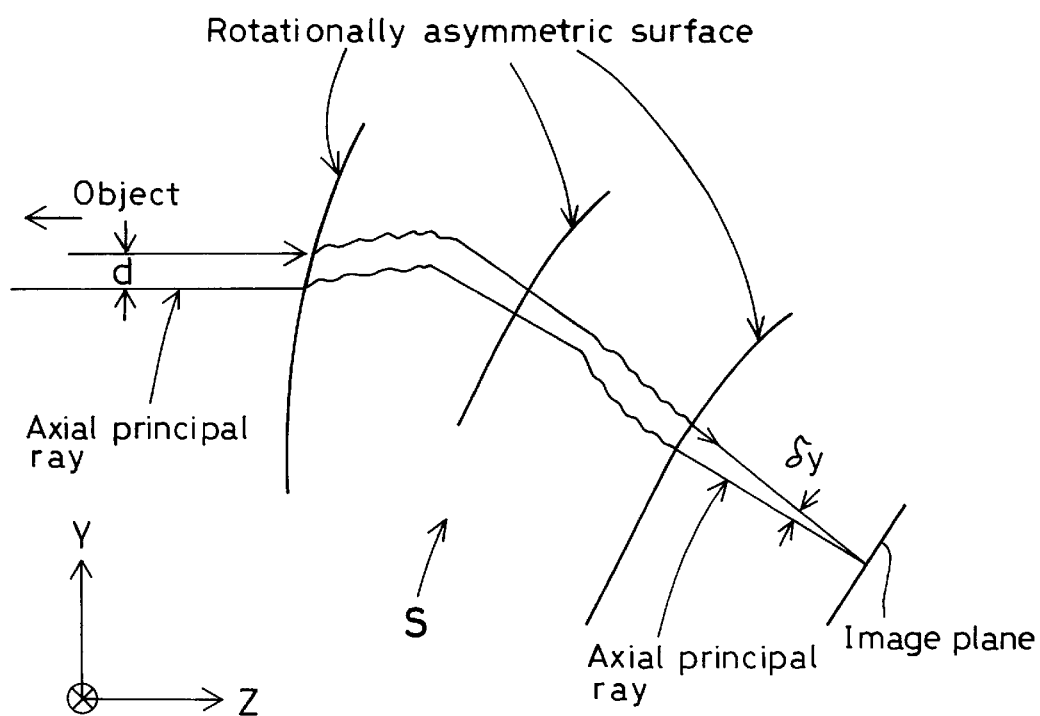
FIG. 15 is a diagram for describing the definition of the power of a decentered optical system and the power of an optical surface.
Figure 16:
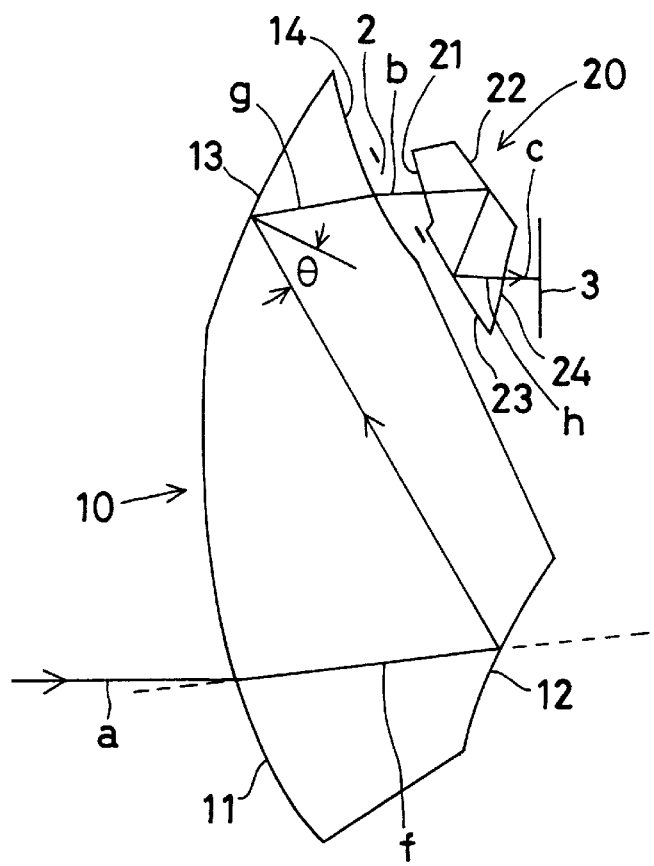
FIG. 16 is a conceptual view showing one form of the image-forming optical system according to the present invention.
Figure 17:
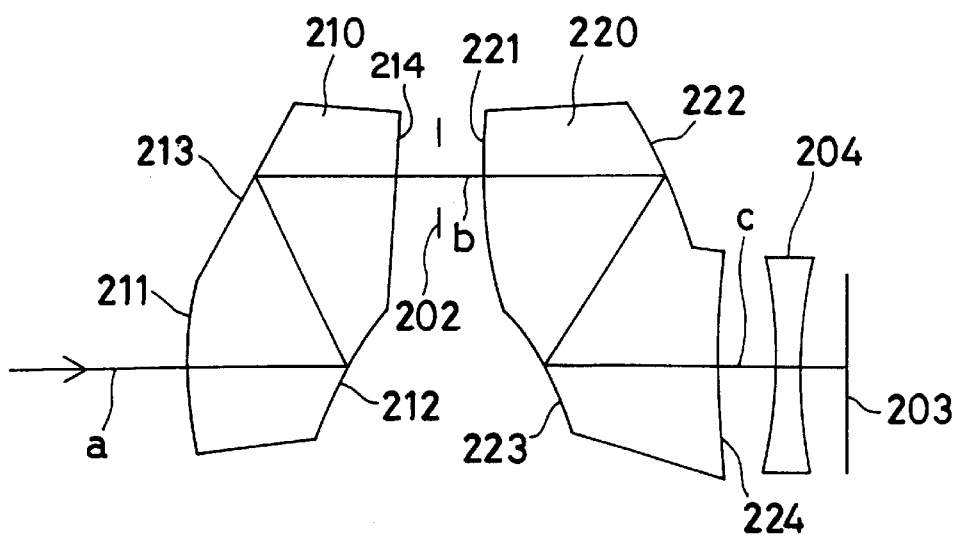
FIG. 17 is a conceptual view of a conventional image-forming optical system.

FIG. 14 is a diagram showing a desirable arrangement for the image-forming optical system according to the present invention when the image-forming optical system is placed in front of an image pickup device, e.g. a CCD, or a filter. In the figure, a decentered prism P is the second prism included in the image-forming optical system according to the present invention. When the image pickup surface C of an image pickup device forms a quadrangle as shown in the figure, it is desirable from the viewpoint of forming a beautiful image to place the decentered prism P so that the plane D of symmetry of a plane-symmetry free-form surface provided in the decentered prism P is parallel to at least one of the sides forming the quadrangular image pickup surface C.

When the image pickup surface C has a shape in which each of the four interior angles is approximately 90 degrees, such as a square or a rectangle, it is desirable that the plane D of symmetry of the plane-symmetry free-form surface should be parallel to two sides of the image pickup surface C that are parallel to each other. It is more desirable that the plane D of symmetry should lie at the middle between two parallel sides and coincide with a position where the image pickup surface C is in a symmetry between the right and left halves or between the upper and lower halves. The described arrangement enables the required assembly accuracy to be readily obtained when the image-forming optical system is incorporated into an apparatus. This is useful for mass-production.

When a plurality or all of the optical surfaces constituting the decentered prism P, i.e. the first surface, the second surface, the third surface, and the fourth surface, are plane-symmetry free-form surfaces, it is desirable from the viewpoint of design and aberration correcting performance to arrange the decentered prism P so that the planes of symmetry of the plurality or all of the optical surfaces are in the same plane D. In addition, it is desirable that the plane D of symmetry and the image pickup surface C should be in the above-described relationship.

As will be clear from the foregoing description, the present invention makes it possible to obtain a high-performance and low-cost image-forming optical system with a minimal number of constituent optical elements. In addition, it is possible to obtain a high-performance image-forming optical system that is made compact and thin by folding an optical path using reflecting surfaces arranged to minimize the number of reflections.

What I claim is:

1. An image-forming optical system having a positive refracting power as a whole for forming an object image, said image-forming optical system comprising:

a first prism and a second prism, each of said first prism and second prism being formed from a medium having a refractive index (n) larger than 1 (n>1), said second prism being placed at a position on an image side of said first prism in an optical path exiting said first prism and leading to a plane where said object image is formed, wherein no intermediate image is formed, said first prism having, in order from an object side thereof;

a first surface through which a light beam enters said first prism;

a second surface that reflects said light beam in said first prism;

a third surface that reflects said light beam reflected by said second surface in said first prism; and a fourth surface through which said light beam exits from said first prism;

wherein at least one of said second surface and said third surface of said first prism has a curved surface configuration providing a refractive power acting on said light beam, said curved surface configuration having a rotationally asymmetric surface configuration that corrects aberrations due to decentration;

said second prism having, in order from an object side thereof;

a first surface through which said light beam enters said second prism;

a second surface that reflects said light beam in said second prism;

a third surface that reflects said light beam reflected by said second surface in said second prism; and a fourth surface through which said light beam exits from said second prism;

wherein at least one of said second surface and third surface of said second prism has a curved surface configuration providing a refractive power acting on said light beam, said curved surface configuration having a rotationally asymmetric surface configuration that corrects aberrations due to decentration; and wherein any optical element that gives a refracting power contributing to an image-forming action of said light beam is placed other than between said second prism and an image formed by said image-forming optical system.

2. An image-forming optical system having a positive refracting power as a whole for forming an object image, said image-forming optical system comprising:

a first prism and a second prism, each of said first prism and second prism being formed from a medium having a refractive index (n) larger than 1 (n>1), said second prism being placed on an image side of said first prism, wherein no intermediate image is formed, said first prism having, in order from an object side thereof:

a first surface through which a light beam enters said first prism;

a second surface that reflects said light beam in said first prism;

a third surface that reflects said light beam reflected by said second surface in said first prism; and a fourth surface through which said light beam exits from said first prism;

wherein at least one of said second surface and said third surface of said first prism has a curved surface configuration providing a refractive power acting on said light beam, said curved surface configuration having a rotationally asymmetric surface configuration that corrects aberration due to decentration;

said second prism having, in order from an object side thereof:

a first surface through which said light beam enters said second prism;

a second surface that reflects said light beam in said second prism;

a third surface that reflects said light beam reflected by said second surface in said second prism; and a fourth surface through which said light beam exits from said second prism; and wherein at least one of said second surface and said third surface of said second prism has a curved surface configuration providing a refractive power acting on said, said curved surface configuration having a rotationally asymmetric surface configuration that corrects aberrations due to decentration; and wherein said second prism is arranged such that a first axial principal ray that is led from said third surface of said second prism to said fourth surface of said second prism is closer to a second axial principal ray that is led from said third surface of said first prism to said fourth surface of said first prism than a third axial principal ray of said light beam incident on said first prism that is led from said first surface of said first prism to said second surface of said first prism and an extension of said third axial principal ray.

3. An image-forming optical system having a positive refracting power as a whole for forming an object image, said image-forming optical system comprising:

a first prism and a second prism, each of said first prism and second prism being formed from a medium having a refractive index (n) larger than 1 (n>1), said second prism being placed on an image side of said first prism, wherein no intermediate image is said first prism having, in order from an object side thereof:
 a first surface through which a light beam enters said first prism;
 a second surface that reflects said light beam in said first prism;
 a third surface that reflects said light beam reflected by said second surface in said first prism; and
 a fourth surface through which said light beam exits from said first prism;
 wherein at least one of said second surface and said third surface of said first prism has a curved surface configuration providing a refractive power acting on said light beam, said curved surface configuration having a rotationally asymmetric surface configuration that corrects aberrations due to decentration;
said second prism having, in order from an object side thereof:
 a first surface through which said light beam enters said second prism;
 a second surface that reflects said light beam in said second prism;
 a third surface that reflects said light beam reflected by said second surface in said second prism; and
 a fourth surface through which said light beam exits from said second prism;
 wherein at least one of said second surface and third surface of said second prism has a curved surface configuration providing a refractive power acting on said light beam, said curved surface configuration having a rotationally asymmetric surface configuration that corrects aberrations due to decentration; and
 wherein the fourth surface of said first prism and said first surface of said second prism face each other, and said third surface of said second prism faces a direction other than said second surface of said first prism and lies closer to said fourth surface of said first prism than said second surface of said first prism so that said first surface and second surface of said first prism and said third surface and fourth surface of said second prism and further an image plane do not lie in parallel on a line extending straight from an axial principal ray entering said first prism, said third surface and fourth surface of said second prism and said image plane being off said line extending straight from said axial principal ray entering said first prism.

4. An image-forming optical system according to any one of claims 1 to 3, wherein said first prism is arranged such that said first surface and fourth surface of said first prism face each other across said medium, and said second surface and third surface of said first prism face each other across said medium, thereby forming a Z-shaped optical path, and
 said second prism is arranged such that said first surface and fourth surface of said second prism face each other across said medium, and said second surface and third surface of said second prism face each other across said medium, thereby forming a Z-shaped optical path.

5. An image-forming optical system according to any one of claims 1 to 3, wherein said first prism is arranged such that said first surface, which is a transmitting surface through which a light beam enters said first prism, and said fourth surface, which is a transmitting surface through which the light beam exits from said first prism, are not adjacent to each other but in a positional relationship in which a reflecting surface lies between said first surface and said fourth surface, and said second prism is arranged such that said first surface, which is a transmitting surface through which a light beam enters said second prism, and said fourth surface, which is a transmitting surface through which the light beam exits from said second prism, are not adjacent to each other but in a positional relationship in which a reflecting surface lies between said first surface and said fourth surface.

6. An image-forming optical system according to any one of claims 1 to 3, wherein an optical path length for an axial principal ray from said first surface to said fourth surface in said first prism is longer than an optical path length for an axial principal ray from said first surface to said fourth surface in said second prism.

7. An image-forming optical system according to claim 6, wherein said first prism and said second prism satisfy the following condition:

$$0.10 < L2/L1 < 0.85$$

where L1 is the optical path length for the axial principal ray from the first surface to the fourth surface in said first prism, and L2 is the optical path length for the axial principal ray from the first surface to the fourth surface in said second prism.

8. An image-forming optical system according to any one of claims 1 to 3, wherein both the second surface and third surface of said first prism have a rotationally asymmetric surface configuration that gives a power to a light beam and corrects aberrations due to decentration.

9. An image-forming optical system according to any one of claims 1 to 3, wherein both the second surface and third surface of said second prism have a rotationally asymmetric surface configuration that gives a power to a light beam and corrects aberrations due to decentration.

10. An image-forming optical system according to any one of claims 1 to 3, wherein the rotationally asymmetric surface configuration of at least one of the second surface and third surface of said first prism is a plane-symmetry free-form surface having only one plane of symmetry.

11. An image-forming optical system according to any one of claims 1 to 3, wherein the rotationally asymmetric surface configuration of at least one of the second surface and third surface of said second prism is a plane-symmetry free-form surface having only one plane of symmetry.

12. An image-forming optical system according to claim 8, wherein the rotationally asymmetric surface configurations of both said second surface and third surface of said first prism are plane-symmetry free-form surfaces each having only one plane of symmetry.

13. An image-forming optical system according to claim 9, wherein the rotationally asymmetric surface configurations of both said second surface and third surface of said second prism are plane-symmetry free-form surfaces each having only one plane of symmetry.

14. An image-forming optical system according to claim 12, wherein the only one plane of symmetry of the plane-symmetry free-form surface that forms the second surface of said first prism and the only one plane of symmetry of the plane-symmetry free-form surface that forms the third surface of said first prism are in a same plane.

15. An image-forming optical system according to claim 12, wherein the only one plane of symmetry of the plane-symmetry free-form surface that forms the second surface of said second prism and the only one plane of symmetry of the plane-symmetry free-form surface that forms the third surface of said second prism are in a same plane.

16. An image-forming optical system according to claim 15, wherein the only one plane of symmetry of each of the plane-symmetry free-form surfaces that form the second surface and third surface of said first prism and the only one plane of symmetry of each of the plane-symmetry free-form surfaces that form the second surface and third surface of the second prism are in a same plane.

17. An image-forming optical system according to claim 8, wherein at least one of said first surface and fourth surface of said first prism has a rotationally asymmetric surface configuration that gives a power to a light beam and corrects aberrations due to decentration.

18. An image-forming optical system according to claim 17, wherein the rotationally asymmetric surface configuration of at least one of said first surface and fourth surface of said first prism is a plane-symmetry free-form surface having only one plane of symmetry.

19. An image-forming optical system according to claim 8, wherein at least one of said first surface and fourth surface of said second prism has a rotationally asymmetric surface configuration that gives a power to a light beam and corrects aberrations due to decentration.

20. An image-forming optical system according to claim 19, wherein the rotationally asymmetric surface configuration of at least one of said first surface and fourth surface of said second prism is a plane-symmetry free-form surface having only one plane of symmetry.

21. An image-forming optical system according to any one of claims 1 to 3, wherein a pupil is placed between said first prism and said second prism, and said second prism is placed between said pupil and an image plane.

22. An image-forming optical system according to claim 21, wherein a stop is placed on said pupil.

23. An image-forming optical system according to any one of claims 1 to 3, wherein an axial principal ray entering said second prism and an axial principal ray exiting from said second prism are approximately parallel to each other.

24. An image-forming optical system according to any one of claims 1 to 3, wherein when a decentration direction of said image-forming optical system is a Y-axis direction and a plane parallel to an axial principal ray is a YZ-plane, at least one of the following conditions is satisfied:

$$-2 < Pxs3/Px < 0 \quad (2)$$
$$-2 < Pys3/Py < 0 \quad (3)$$

where Pxs3/Px is a value obtained by dividing a power in an X-axis direction of the second surface of said first prism by a power in the X-axis direction of said image-forming optical system, and Pys3/Py is a value obtained by dividing a power in the Y-axis direction of the second surface of said first prism by a power in the Y-axis direction of said image-forming optical system.

25. An image-forming optical system according to any one of claims 1 to 3, wherein when a decentration direction of said image-forming optical system is a Y-axis direction and a plane parallel to an axial principal ray is a YZ-plane, at least one of the following conditions is satisfied:

$$0 < Pxs4/Px < 2 \quad (4)$$
$$0 < Pys4/Py < 2 \quad (5)$$

where Pxs4/Px is a value obtained by dividing a power in an X-axis direction of the third surface of said first prism by a power in the X-axis direction of said image-forming optical system, and Pys4/Py is a value obtained by dividing a power in the Y-axis direction of the third surface of said first prism by a power in the Y-axis direction of said image-forming optical system.

26. An image-forming optical system according to any one of claims 1 to 3, wherein when a decentration direction of said image-forming optical system is a Y-axis direction and a plane parallel to an axial principal ray is a YZ-plane, the following condition is satisfied:

$$1 < (S3-S4)/Fx < 20 \quad (6)$$

where S3−S4 is an optical path length for the axial principal ray between the second surface and third surface of said first prism (the optical path length being obtained by multiplying a distance between said second and third surfaces by a refractive index), and Fx is a focal length in an X-axis direction of said image-forming optical system.

27. An image-forming optical system according to any one of claims 1 to 3, wherein when a decentration direction of said image-forming optical system is a Y-axis direction and a plane parallel to an axial principal ray is a YZ-plane, at least one of the following conditions is satisfied:

$$0 < Pxs10/Px < 3 \quad (7)$$
$$0 < Pys10/Py < 3 \quad (8)$$

where Pxs10/Px is a value obtained by dividing a power in an X-axis direction of the second surface of said second prism by a power in the X-axis direction of said image-forming optical system, and Pys10/Py is a value obtained by dividing a power in the Y-axis direction of the second surface of said second prism by a power in the Y-axis direction of said image-forming optical system.

28. An image-forming optical system according to any one of claims 1 to 3, wherein the following condition is satisfied:

$$10° < S4\theta < 60° \quad (9)$$

where S4θ is an angle of incidence of an axial principal ray on the third surface of said first prism.

29. A finder optical system comprising:

the image-forming optical system of any one of claims 1 to 3, said image-forming optical system being provided as a finder objective optical system;

an image-inverting optical system for erecting an object image formed by said finder objective optical system; and an ocular optical system.

30. A camera apparatus comprising:

the finder optical system of claim 29; and an objective optical system for photography provided in parallel to said finder optical system.

31. An image pickup optical system comprising:

the image-forming optical system of any one of claims 1 to 3; and an image pickup device placed in an image plane formed by said image-forming optical system.

32. A camera apparatus comprising:

the image-forming optical system of any one of claims 1 to 3, said image-forming optical system being provided as an objective optical system for photography; and a finder optical system placed in one of an optical path separate from an optical path of said objective optical system for photography and an optical path branched from the optical path of said objective optical system for photography.

33. An electronic camera apparatus comprising:

the image-forming optical system of any one of claims 1 to 3;

an image pickup device placed in an image plane formed by said image-forming optical system;

a recording medium for recording image information received by said image pickup device; and an image display device that receives image information from one of said recording medium and said image pickup device to form an image for observation.

34. An endoscope system comprising:

an observation system having the image-forming optical system of any one of claims 1 to 3 and an image transmitting member for transmitting an image formed by said image-forming optical system along a longitudinal axis; and an illumination system having an illuminating light source and an illuminating light transmitting member for transmitting illuminating light from said illuminating light source along the longitudinal axis.

* * * * *